US006074792A

United States Patent [19]

Namba et al.

[11] Patent Number: 6,074,792

[45] Date of Patent: Jun. 13, 2000

[54] TETRAAZAPORPHYRIN PIGMENT FOR USE IN ELECTROPHOTOGRAPHIC PHOTOCONDUCTOR AND ELECTROPHOTOGRAPHIC PHOTOCONDUCTOR USING THE SAME

[75] Inventors: Michihiko Namba, Kanagawa; Masayuki Shoshi, Shizuoka; Kaoru Tadokoro, Kanagawa, all of Japan

[73] Assignee: Ricoh Company, Ltd., Tokyo, Japan

[21] Appl. No.: 09/114,217

[22] Filed: Jul. 13, 1998

[30] Foreign Application Priority Data

| | | | |
|---|---|---|---|
| Jul. 14, 1997 | [JP] | Japan | 9-203846 |
| Dec. 25, 1997 | [JP] | Japan | 9-357380 |
| Jul. 10, 1998 | [JP] | Japan | 10-195797 |

[51] Int. Cl.[7] .......... G03G 5/06

[52] U.S. Cl. .......... 430/59.1; 430/56; 430/78; 430/58.25; 430/58.65

[58] Field of Search .......... 540/121; 430/78, 430/59.1, 58.65, 58.75, 56

[56] References Cited

U.S. PATENT DOCUMENTS

| | | | |
|---|---|---|---|
| 2,681,345 | 6/1954 | France | 540/121 |
| 2,774,913 | 5/1956 | France | 540/121 |
| 2,850,505 | 9/1958 | Hein | 540/121 |
| 4,567,124 | 1/1986 | Ohta et al. . | |
| 4,603,097 | 7/1986 | Shoshi et al. . | |
| 5,350,653 | 9/1994 | Shoshi et al. . | |
| 5,486,438 | 1/1996 | Shoshi et al. . | |
| 5,492,784 | 2/1996 | Yoshikawa et al. . | |
| 5,578,405 | 11/1996 | Ikegami et al. . | |
| 5,700,614 | 12/1997 | Kawahara et al. . | |

FOREIGN PATENT DOCUMENTS

| | | |
|---|---|---|
| 5-247073 | 9/1993 | Japan . |

OTHER PUBLICATIONS

Borsenberger, Paul M. et al. Organic Photoreceptors for Imaging System. New York: Marcel–Dekker, Inc. pp. 338–345, 413, 422–425, 1993.

*Primary Examiner*—Christopher D. Rodee
*Attorney, Agent, or Firm*—Oblon, Spivak, McClelland, Maier & Neustadt, P.C.

[57] ABSTRACT

A pigment includes a compound with a tetraazaporphyrin skeleton represented by formula (I):

(I)

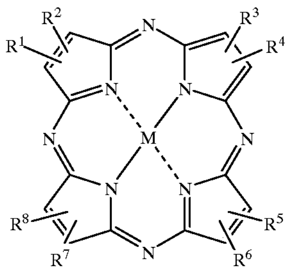

wherein M is a hydrogen atom, or an atom or compound capable of bonding to tetraazaporphyrin through a covalent bond or a coordinate bond; and $R^1$ to $R^8$ are each independently a hydrogen atom, a lower alkyl group which may have a substituent, or an aryl group which may have a substituent. In addition, the above-mentioned pigment is used as a charge generation material in an electrophotographic photoconductor comprising an electroconductive support and a photoconductive layer formed thereon.

16 Claims, 9 Drawing Sheets

TETRAAZAPORPHYRIN PIGMENT FOR USE IN ELECTROPHOTOGRAPHIC PHOTOCONDUCTOR AND ELECTROPHOTOGRAPHIC PHOTOCONDUCTOR USING THE SAME

BACKGROUND OF THE INVENTION

1. Field of the Invention

The present invention relates to a pigment with a specific tetraazaporphyrin skeleton, which serves as a charge generation material capable of generating charge carriers when exposed to light, and an electrophotographic photoconductor comprising a photoconductive layer which contains the above-mentioned pigment therein.

2. Discussion of Background

Conventionally, inorganic materials such as selenium, cadmium sulfide and zinc oxide are used as photoconductive materials of an electrophotographic photoconductor in the electrophotographic process. The above-mentioned electrophotographic process is one of the image forming processes, through which the surface of the photoconductor is charged uniformly in the dark to a predetermined polarity, for instance, by corona charge. The uniformly charged photoconductor is exposed to a light image to selectively dissipate the electric charge or the exposed areas, so that a latent electrostatic image is formed on the photoconductor. The thus formed latent electrostatic image is developed into a visible image by a toner comprising a coloring agent such as a dye or pigment, and a binder agent such as a polymeric material.

Fundamental characteristics required for the photoconductor in such an electrophotographic process are: (1) chargeability to an appropriate potential in the dark, (2) minimum dissipation of electric charge in the dark, and (3) rapid dissipation of electric charge when exposed to light.

However, while the above-mentioned inorganic materials have many advantages, they have several shortcomings from the viewpoint of practical use.

For instance, a selenium photoconductor has the shortcomings that the manufacturing conditions are difficult and, accordingly, its production cost is high. In addition, it is difficult to work it into the form of a belt due to its poor flexibility, and it is so vulnerable to heat and mechanical shocks that it must be handled with the utmost care.

A cadmium sulfide photoconductor and a zinc oxide photoconductor can be easily obtained by dispersing cadmium sulfide particles and zinc oxide particles respectively in a binder resin, and coating the thus prepared coating liquid on a support. However, they are poor in terms of the mechanical properties, such as surface smoothness, hardness, tensile strength and wear resistance. Therefore, they cannot be used in the repeated operations as they are.

To solve the problems of the inorganic materials, various electrophotographic photoconductors employing organic materials are proposed in recent years and some are still put to practical use. For example, there are known a photoconductor comprising poly-N-vinylcarbazole and 2,4,7-trinitrofluorene-9-on, as disclosed in U.S. Pat. No. 3,484,237; a photoconductor prepared by sensitizing poly-N-vinylcarbazole with a pigment of pyrylium salt, as disclosed in Japanese Patent Publication 48-25658; a photoconductor comprising as the main component an organic pigment as disclosed in Japanese Laid-Open Patent Application 47-37543; and a photoconductor comprising as the main component a eutectic crystal complex of a dye and a resin, as disclosed in Japanese Laid-Open Patent Application 47-10735.

In particular, a laminated-type photoconductor fabricated by successively overlaying a charge generation layer in the form of a thin film of an organic pigment and a charge transport layer comprising a charge transport material on an electroconductive support has been actively studied because the sensitivity of the photoconductor is high and there are a large variety of materials therefore Thus, the laminated-type photoconductor has become the mainstream in the field of the copying machine and printer. However, the conventional laminated-type photoconductors are still unsatisfactory in light of such requirements for the advanced photoconductor as to cope with high speed operation of the copying machine and show high sensitivity in the wavelength range of the semiconductor laser.

In recent years, the copying machine is required not only to produce high quality images, but also to be provided with text editing function and composite processing function. In line with the above-mentioned demands, non-impact printing technology has been developed and digital recording apparatuses such as a laser printer, laser facsimile machine and digital copying machine have been widely utilized.

Most of the above-mentioned digital recording apparatuses employ as a light source a semiconductor laser beam because it is compact, cheap and convenient. The wavelength of the currently used semiconductor laser beam is limited to 600 nm or more, so that the electrophotographic photoconductors used in the above-mentioned digital recording apparatuses are required to show sufficient photosensitivity in the wavelength range of at least 600 to 850 nm.

The organic photoconductive materials, for example, a phthalocyanine pigment, azo pigment, cyanine pigment, azulene pigment, and squarylium pigment are conventionally known to satisfy the above-mentioned requirements. In particular, the phthalocyanine pigment can show absorption and photosensitivity in the relatively long wavelength range. In addition, a variety of phthalocyanine pigments can be obtained according to the kind of central metal or the type of crystalline form. Therefore, research and development of the phthalocyanine pigment has been actively conducted to obtain the improved electrophotographic photoconductor for use with the semiconductor laser.

There are conventionally known $\epsilon$-type copper phthalocyanine, X-type metal-free phthalocyanine, $\tau$-type metal-free phthalocyanine, vanadyl phthalocyanine and titanyloxy phthalocyanine (Japanese Laid-Open Patent Applications 8-231869, 8-66595 and 8-13942). However, any of the above-mentioned phthalocyanine compounds are still insufficient in terms of photo-sensitivity, chargeability, and the durability in the repeated use.

SUMMARY OF THE INVENTION

Accordingly, a first object of this invention is to provide a pigment effectively serving as the organic photoconductive material in an electrophotographic photoconductor for use in the copying machine, in particular, a laminated-type photoconductor for use in the laser printer.

A second object of the present invention is to provide an electrophotographic photoconductor employing the above-mentioned pigment as the organic photoconductive material.

The above-mentioned first object of the present invention can be achieved by a pigment comprising a compound with a tetraazaporphyrin skeleton represented by formula (I):

(I)

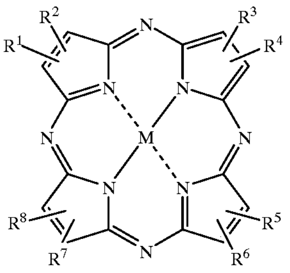

wherein M is a hydrogen atom, or an atom or compound capable of bonding to tetraazaporphyrin through a covalent bond or a coordinate bond; and $R^1$ to $R^8$ are each independently a hydrogen atom, a lower alkyl group which may have a substituent, or an aryl group which may have a substituent.

The second object of the present invention can be achieved by an electrophotographic photoconductor comprising an electroconductive support, and a photoconductive layer formed thereon comprising a charge transport material and a charge generation material which comprises a pigment comprising a compound with a tetraazaporphyrin skeleton represented by formula (I):

(I)

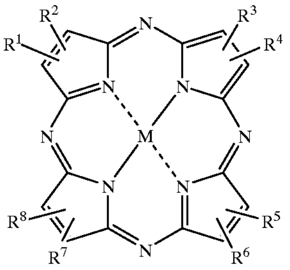

wherein M is a hydrogen atom, or an atom or compound capable of bonding to tetraazaporphyrin through a covalent bond or a coordinate bond; and $R^1$ to $R^8$ are each independently a hydrogen atom, a lower alkyl group which may have a substituent, or an aryl group which may have a substituent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
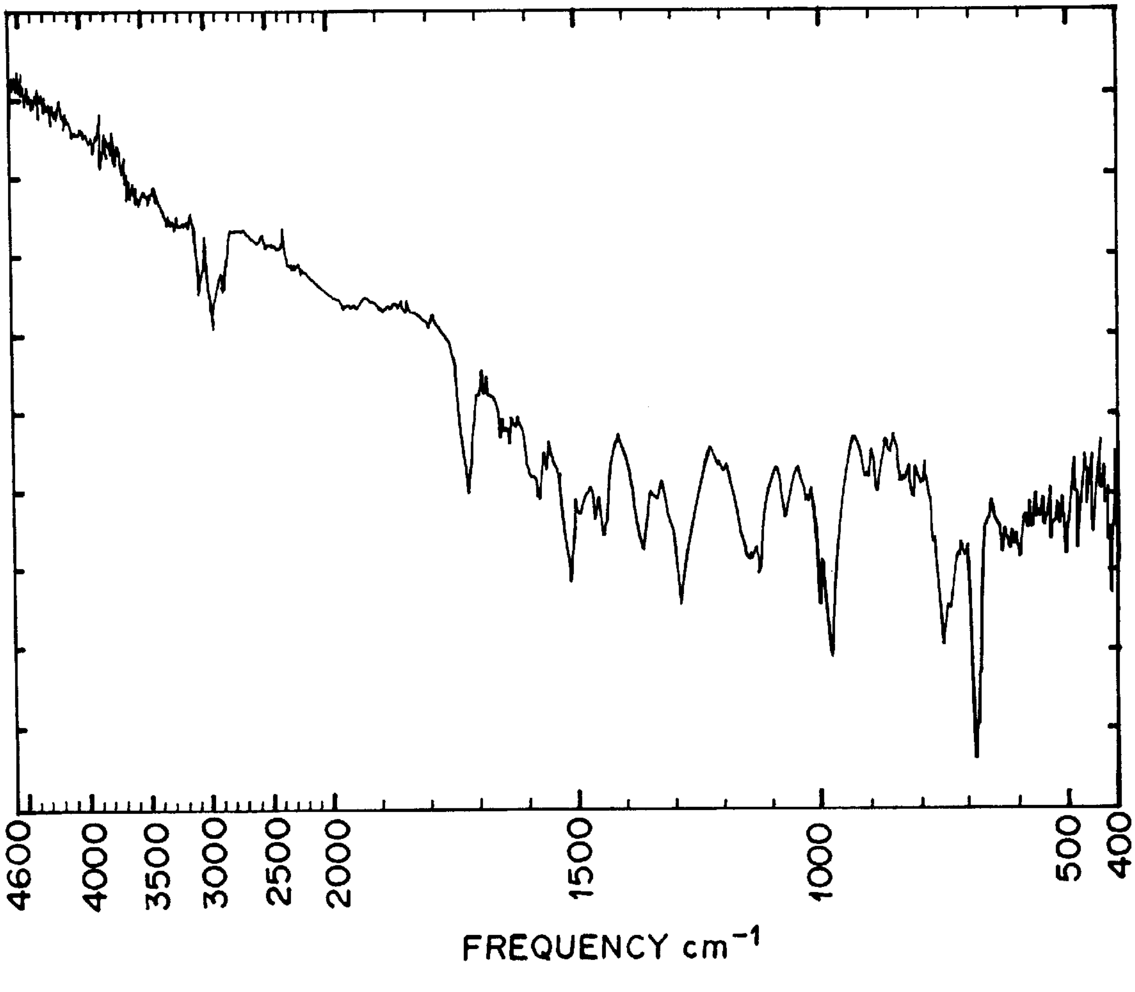
FIG. 1 is an IR spectrum of a tetraazaporphyrin pigment obtained in Preparation Example 1.

In a pigment comprising a compound with a tetraazaporphyrin skeleton of formula (I) according to the present invention (which will also be hereinafter referred to as a tetraazaporphyrin pigment), M represents an atom such as H, Ti, Co, Ni, Cu, Al, Mg, Pb, V, Fe, Zn, Ge, Sn, Ga, Mo or In; or an oxide, a halide such as a fluoride, chloride, bromide or iodide, or a hydroxide comprising the above-mentioned atom.

$R^1$ to $R^8$ in formula (I), which may be the same or different, are each a hydrogen atom, a lower alkyl group which may have a substituent, or an aryl group which may have a substituent.

Examples of the above-mentioned alkyl group represented by $R^1$ to $R^8$ are straight-chain or branched lower alkyl groups, such as methyl group, ethyl group, propyl group and butyl group. As the substituent for the alkyl group, a halogen atom such as fluorine atom or chlorine atom can be employed.

Examples of the above-mentioned aryl group represented by $R^1$ to $R^8$ are phenyl group, naphthyl group and pyrenyl group. Examples of the substituent for the aryl group include a halogen atom such as fluorine atom or chlorine atom, and an alkyl group such as methyl group or ethyl group.

Specific examples of the pigment with the tetraazaporphyrin skeleton of formula (I) according to the present invention are shown in TABLE 1.

TABLE 1

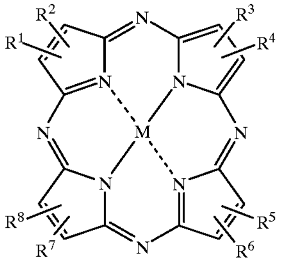

| Comp. No. | $R^1$, $R^3$, $R^5$, $R^7$ | $R^2$, $R^4$, $R^6$, $R^8$ | M |
|---|---|---|---|
| 1 | $C_6H_5$— | $C_6H_5$— | Cu |
| 2 | $C_6H_5$— | H | Cu |
| 3 | $CH_3$— | H | Cu |
| 4 | $CH_3$— | H | Ti=O |
| 5 | $C_6H_5$— | H | Ti=O |
| 6 | $C_6H_5$— | $C_6H_5$— | Ti=O |
| 7 | $C_6H_5$— | $C_6H_5$— | Ni |
| 8 | $C_6H_5$— | H | Co |
| 9 | t-$C_4H_9$— | H | Cu |
| 10 | $C_6H_5$— | $C_6H_5$— | Co |
| 11 | $C_2H_5$— | H | Cu |
| 12 | $C_6H_5$— | H | Ni |
| 13 | $C_6H_5$— | $C_6H_5$— | H |
| 14 | $CH_3$— | H | Ni |
| 15 | $CH_3$— | H | Co |
| 16 | $C_6H_5$— | H | H |
| 17 | $C_6H_5$— | $C_6H_5$— | Al |
| 18 | $C_2H_5$— | H | Ni |
| 19 | $C_2H_5$— | H | Co |
| 20 | t-$C_4H_9$— | H | Ni |
| 21 | $C_6H_5$— | $C_6H_5$— | Mg |
| 22 | $C_6H_5$— | H | Mg |

The compound with the tetraazaporphyrin skeleton of formula (I) can be synthesized by heating a corresponding dinitrile compound and a metallic chloride or an alkoxymetal, with no solvent, or in the presence of a halogenated solvent such as α-chloronaphthalene, dichlorobenzene or trichlorobenzene, an alcohol solvent such as pentanol or octanol, an amine solvent such as N,N-dimethylformamide or N-methyl-pyrrolidone, or an aromatic solvent such as benzene, toluene or nitrobenzene. The reaction temperature is generally in the range of room temperature to 300° C., preferably in the range of 100 to 250° C. in light of the reaction yield.

Alternatively, the above-mentioned tetraazaporphyrin pigment of formula (I) can also be synthesized by heating a mixture of a corresponding acid anhydride and a metallic chloride in the presence of a catalyst such as an amine compound, for example, urea or ammonium molybdate. In this case, the previously mentioned solvent may be used or not. The reaction temperature is generally in the range of room temperature to 300° C., preferably in the range of 100 to 250° C. in light of the reaction yield.

It is preferable that the resultant reaction product of compound with the tetraazaporphyrin skeleton of formula (I) be in a crystalline state, in particular, be in such a specific crystalline form that exhibits a major diffraction peak at 21.2° in terms of a Bragg angle 2θ±0.20° in an X-ray diffraction spectrum using a Cu—Kα ray.

When the tetraazaporphyrin pigment of formula (I) is contained as the charge generation material in the photoconductive layer of the electrophotographic photoconductor according to the present invention, it is preferable that the photoconductive layer exhibit a major diffraction peak at 21.2° in terms of a Bragg angle 2θ±0.2° in an X-ray diffraction spectrum using a Cu—Kα ray by employing the tetraazaporphyrin pigment in the above-mentioned specific crystalline form.

After the compound with the tetraazaporphyrin skeleton of formula (I) is synthesized by the above-mentioned synthesis method, the tetraazaporphyrin pigment of formula (I) can be turned into the above-mentioned specific crystalline state through a treatment using an acid or a solvent, or milling treatment.

To be more specific, the treatment using an acid is carried out in such a manner that the tetraazaporphyrin pigment is first dissolved in an acid such as acetic acid or sulfuric acid at 5° C. or less, the thus prepared solution of the pigment is added dropwise to ice-cold water to precipitate the crystals of the pigment, and thereafter the thus precipitated crystals are collected, for example, by filtration. In such an acid treatment, sulfuric acid is particularly preferably employed as the acid.

In the treatment using a solvent, the tetraazaporphyrin pigment is suspended in a solvent with stirring at room temperature or under the application of heat. Examples of the solvent used in such a solvent treatment include alcohols such as methanol and ethanol; ketones such as cyclohexanone and methyl ethyl ketone; ethers such as n-butyl ether, ethylene glycol n-butyl ether and tetrahydrofuran; amines such as N,N-dimethylformamide, N-methylpyrrolidone and quinoline; aromatic solvents such as benzene, toluene and nitrobenzene; and water. In particular, the aromatic solvents such as benzene, toluene and nitrobenzene are preferably employed.

The previously mentioned milling treatment employs a milling apparatus such as sand mill or ball mill, using glass beads, steel beads and alumina balls.

Specific examples of the solvent used in the milling treatment include alcohols such as methanol and ethanol; ketones such as cyclohexanone and methyl ethyl ketone; ethers such as n-butyl ether, ethylene glycol n-butyl ether and tetrahydrofuran; amines such as N,N-dimethylformamide, N-methylpyrrolidone and quinoline; water; and basic solvents such as pyridine.

Further, the compound with the tetraazaporphyrin skeleton of formula (I) in such a crystalline form that exhibits a major diffraction peak at 21.2° in terms of a Bragg angle 2θ±0.2° in the X-ray diffraction spectrum using the Cu—Kα ray can be obtained by subjecting a tetraazaporphyrin compound of formula (I) to the above-mentioned acid treatment, followed by a solvent treatment using a solvent. In this case, the compound is refluxed with stirring together with a solvent under application of heat thereto, and the solvent used in this solvent treatment may be selected from the group consisting of an alcohol solvent, an ether solvent, a ketone solvent and water. Alternatively, the solvent may be selected from the group consisting of an amine solvent and an aromatic hydrocarbon solvent.

Alternatively, the tetraazaporphyrin compound of formula (I) can also be treated so as to form the above-mentioned specific crystal structure by adding the pigment to a mixed solvent of a trihaloacetic acid and an alkylene halide to prepare a solution or slurry of the pigment, and further adding the thus prepared solution or slurry to a mixed solvent of a cyclic ether and water to precipitate the crystals, and when necessary, successively washing the precipitated crystals with water and an aliphatic alcohol.

In the above-mentioned treatment, trichloroacetic acid or trifluoroacetic acid can be used as the trihaloacetic acid; and dichloromethane, dichloroethane, chloroform and trichloroethylene can be used as the alkylene halide. In particular, the combination of trifluoroacetic acid and dichloromethane is preferable in the present invention.

It is preferable that the mixing ratio by volume of the trihaloacetic acid to the alkylene halide at the first step be in the range of 1/4 to 1/20, and more preferably in the range of 1/1 to 1/8.

Examples of the cyclic ether in the above-mentioned treatment include tetrahydrofuran, 1,4-dioxane, tetrahydropyran, and tetrahydrofurfuryl alcohol.

It is preferable that the mixing ratio by volume of the cyclic ether to water at the second step be in the range of 3/1 to 1/3.

As previously mentioned, when necessary, the precipitated crystals may be successively washed with water and an aliphatic alcohol such as methanol, ethanol, n-propanol, isopropanol, or n-butanol.

There can be thus obtained a pigment comprising a compound with a tetraazaporphyrin skeleton of formula (I) which is in such a crystalline form that exhibits a major diffraction peak at 21.2° in terms of a Bragg angle 2θ±0.2° in the X-ray diffraction spectrum using the Cu—Kα ray with a wavelength of 1.54 Å.

By using the organic pigment with the tetraazaporphyrin skeleton according to the present invention, which serves as a charge generation material, and a charge transport material in combination, an electrophotographic photoconductor with a single-layered photoconductor or a laminated photoconductor can be fabricated.

To fabricate the single-layered type photoconductor, a photoconductive layer in which a charge generation material comprising the tetraazaporphyrin pigment according to the present invention and a charge transport material are dispersed in a binder resin is provided on the electroconductive support. In the case where the laminated photoconductor of a negatively chargeable type is fabricated, a charge generation layer comprising a binder resin and a charge generation material which comprises the aforementioned tetraazaporphyrin pigment is provided on the electroconductive support, and a charge transport layer comprising a binder resin and a charge transport material is overlaid on the charge generation layer. The positively chargeable photoconductor can be obtained by reversing the above-mentioned overlaying order of the charge generation layer and the charge transport layer.

For fabrication of the laminated photoconductive layer, a coating liquid for a charge generation layer is prepared by dispersing or dissolving the charge generation material in an appropriate solvent, with a binder resin being optionally added thereto, using a ball mill, ultrasonic wave, or a homomixer. Then, the above prepared coating liquid may be coated on the electroconductive support by dip coating, blade coating or spray coating.

To upgrade the dispersibility of the charge generation material in the charge generation layer, it is preferable that the average particle size of the charge generation material be in the range of 0.01 to 2 $\mu$m, and more preferably 0.01 to 1 $\mu$m. When the average particle size of the charge generation material is within the above-mentioned range, aggregation of fine particles can be inhibited, so that the increase of the resistivity of the charge generation layer can be prevented. In addition, the deterioration of sensitivity and durability in the repeated use caused by the increase of defective crystallites can be prevented.

In addition to the tetraazaporphyrin pigment of the present invention, the following organic pigments can be used as the charge generation materials: azo pigments such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129) and an azo pigment having a distyryl carbazole skeleton (Japanese Laid-Open Patent Application 54-14967); phthalocyanine pigments such as C.I. Pigment Blue 16 (C.I. 74100) and titanyl phthalocyanine; indigo pigments such as C.I. Vat Brown 5 (C.I. 73410) and C.I. Vat Dye (C.I. 73030); perylene pigments such as Algol Scarlet B and Indanthrene Scarlet R (made by Bayer Co., Ltd.). Two or more organic pigments mentioned above may be used in combination with the tetraazaporphyrin pigment of formula (I).

Specific examples of the solvent which is used to prepare a dispersion or solution for the charge generation layer coating liquid and the charge transport layer coating liquid include N,N-dimethylformamide, toluene, xylene, monochlorobenzene, 1,2-dichloroethane, 1,1,1-trichloroethane, dichloromethane, 1,1,2-trichloroethane, trichloroethylene, tetrahydrofuran, methyl ethyl ketone, methyl isobutyl ketone, cyclohexanone, ethyl acetate and butyl acetate.

Any binder resin that has good electrically insulating properties and conventionally used in the preparation of the electrophotographic photoconductor can be employed for the formation of the charge generation layer, the charge transport layer, and the single-layered photoconductive layer. Specific examples of such a binder resin include addition polymerization-type resins, polyaddition-type resins and polycondensation-type resins such as polyethylene, polyvinyl butyral, polyvinyl formal, polystyrene resin, phenoxy resin, polypropylene, acrylic resin, methacrylic resin, vinyl chloride resin, vinyl acetate resin, epoxy resin, polyurethane resin, phenolic resin, polyester resin, alkyd resin, polycarbonate resin, polyamide resin, silicone resin and melamine resin; copolymer resins comprising as the repeat units two or more monomers for use in the above-mentioned resins, for example, electrically insulating resins such as vinyl chloride—vinyl acetate copolymer resin, styrene—acrylic copolymer resin and vinyl chloride—vinyl acetate—maleic anhydride copolymer resin; and polymeric organic semiconductor such as poly-N-vinylcarbazole. Those binder resins may be used alone or in combination.

It is preferable that the amount of the charge generation material in the charge generation layer of the negatively-chargeable photoconductor be 20 wt. % or more of the total weight of the binder resin for use in the charge generation layer. The thickness of the above-mentioned charge generation layer is preferably in the range of 0.01 to 5 $\mu$m. Further, in this case, it is preferable that the amount of charge transport material in the charge transport layer be in the range of 20 to 200 wt. % of the binder resin for use in the charge transport layer. The thickness of the charge transport layer is preferably in the range of 5 to 100 $\mu$m.

In the positively-chargeable photoconductive layer, it is preferable that the amount of charge transport material for use in the charge transport layer be in the range of 20 to 200 wt. % of the total weight of the binder resin for use in the charge transport layer, and that the thickness of the charge transport layer be in the range of 5 to 100 $\mu$m. In the charge generation layer, it is preferable that the amount of charge generation material be 20 wt. % or more of the total weight of the binder resin for use in the charge generation layer. Further, in such a case, the addition of the charge transport material to the charge generation layer is effective for reducing the residual potential and improving the photosensitivity. When the charge transport material is contained in the charge generation layer, it is preferable that the amount of charge transport material be in the range of 20 to 200 wt. % of the total weight of the binder resin for use in the charge generation layer.

In the single-layered photoconductive layer prepared by dispersing the charge generation material and the charge transport material in the binder resin, it is preferable that the amount of charge generation material be in the range of 5 to 95 wt. %, and the amount of charge transport material be in the range of 30 to 200 wt. %, of the total weight of the binder resin for use in the photoconductive layer. In this case, the thickness of the photoconductive layer is preferably in the range of 10 to 100 $\mu$m.

To improve the chargeability, both the laminated photoconductive layer and the single-layered photoconductive layer may further comprise a phenol compound, a hydroquinone compound, a hindered phenol compound, a hindered amine compound, and a compound having a hindered amine and a hindered phenol in a molecule thereof.

For the electroconductive support, there can be employed a metallic plate, drum or foil made of aluminum, nickel, copper, titanium, gold or stainless steel, a plastic film on which an electroconductive material such as aluminum, nickel, copper, titanium, gold, tin oxide or indium oxide is deposited; and a sheet of paper or a plastic film, which may be formed in a drum, coated with an electroconductive material.

The electrophotographic photoconductor of the present invention may further comprise an intermediate layer which is provided between the electroconductive support and the photoconductive layer in order to prevent the charge injection from the electroconductive support to the photoconductive layer in the course of charging step, and improve the adhesion between the support and the photoconductive layer.

The above-mentioned intermediate layer may be a resin layer which comprises, for instance, polyamide resin, polyvinyl alcohol, ethyl cellulose, carboxymethyl cellulose, vinyl chloride—vinyl acetate copolymer, vinyl chloride—vinyl acetate—maleic anhydride copolymer, casein, and N-alkoxymethyl nylon. Further, tin oxide, aluminum oxide, titanium oxide, silicon oxide or indium oxide may be dispersed in the above-mentioned resin layer. Alternatively, aluminum oxide, zinc oxide, titanium oxide or silicon oxide may be deposited on the electroconductive support to provide the intermediate layer on the support.

Furthermore, a protective layer may be provided on the photoconductive layer to improve the wear resistance and the mechanical durability of the photoconductor.

The above-mentioned protective layer may be a resin layer comprising the same resin as employed in the preparation of the intermediate layer, or a low-resistivity material such as tin oxide or indium oxide may be dispersed in the above-mentioned resin layer. Alternatively, an organic plasma polymerized film can be used as the protective layer, and in this case, oxygen atom, a halogen atom, or an atom belonging to the group III or V in the periodic table may be added to the plasma polymerized film.

The charge transport material for use in the present invention include a positive hole transport material and an electron transport material.

There can be employed any conventional positive hole transport materials, for example, poly-N-vinylcarbazole and derivatives thereof, poly-γ-carbazolyl ethylglutamate and derivatives thereof, a condensation product of pyrene and formaldehyde and derivatives thereof, polyvinyl pyrene, polyvinyl phenanthrene, oxazole derivatives, imidazole derivatives, triphenylamine derivatives, and the compounds to be described later. In particular, a stilbene compound of the following formula (II) is preferably employed as the positive hole transport material because of high charge transporting properties:

(II)

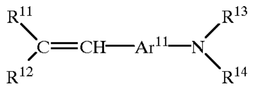

wherein $R^{11}$ and $R^{12}$ are each a hydrogen atom, an alkyl group which may have a substituent, or an aryl group which may have a substituent, and $R^{11}$ and $R^{12}$ may form a ring in combination; $R^{13}$ and $R^{14}$ are each a hydrogen atom, an alkyl group which may have a substituent, an aryl group which may have a substituent, or a heterocyclic group which may have a substituent; and $Ar^{11}$ is an arylene group which may have a substituent, or a heterocyclic group.

Specific examples of the stilbene compound of formula (II) are shown in TABLE 2.

TABLE 2
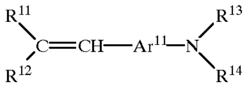
(II)
| No. | $R^{11}$ | $R^{12}$ | $Ar^{11}$ | $R^{13}$ | $R^{14}$ |
|---|---|---|---|---|---|
| 1 | $CH_3$ | $CH_3$ | 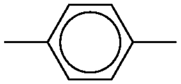 | 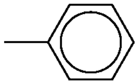 | 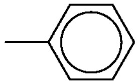 |
| 2 | H | 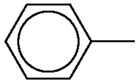 | 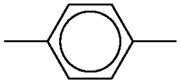 | 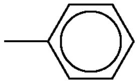 | 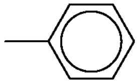 |
| 3 | H | 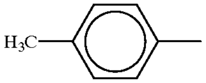 | 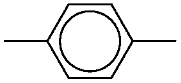 | 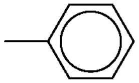 | 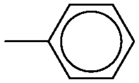 |
| 4 | H | 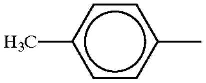 | 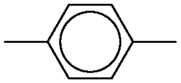 | 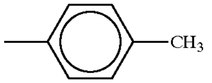 | 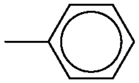 |
| 5 | H | 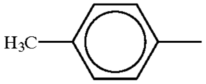 | 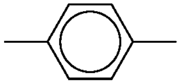 | 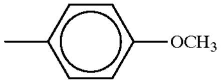 | 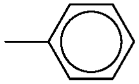 |
| 6 | H | 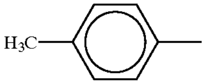 | 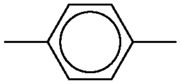 | 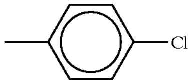 | 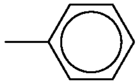 |
| 7 | H | 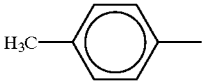 | 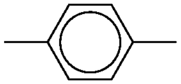 | 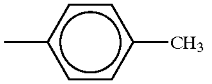 | 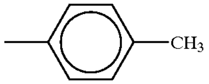 |

TABLE 2-continued
(II)
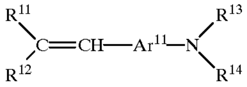
| No. | $R^{11}$ | $R^{12}$ | $Ar^{11}$ | $R^{13}$ | $R^{14}$ |
|---|---|---|---|---|---|
| 8 | H | 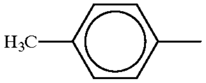 | 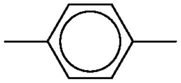 | 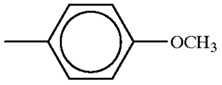 | 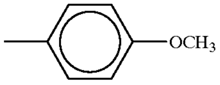 |
| 9 | $CH_3$ | 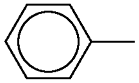 | 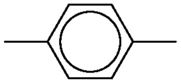 | 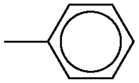 | 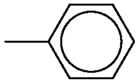 |
| 10 | H | 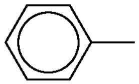 | 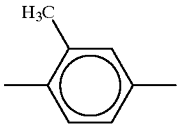 | 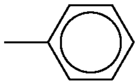 | 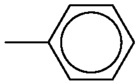 |
| 11 | 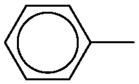 | 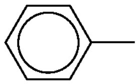 | 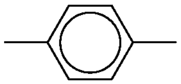 | $-CH_3$ | 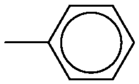 |
| 12 | 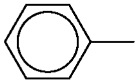 | 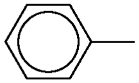 | 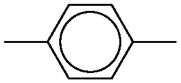 | 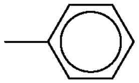 | 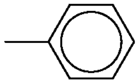 |
| 13 | 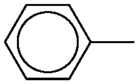 | 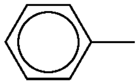 | 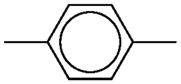 | 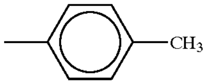 | 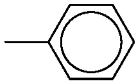 |
| 14 | 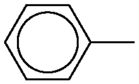 | 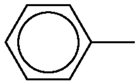 | 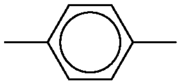 | 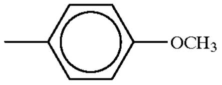 | 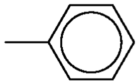 |

TABLE 2-continued
(II)
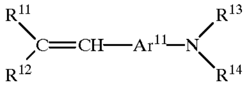
| No. | $R^{11}$ | $R^{12}$ | $Ar^{11}$ | $R^{13}$ | $R^{14}$ |
|---|---|---|---|---|---|
| 15 | 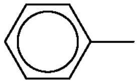 | 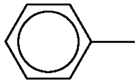 | 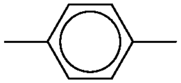 | 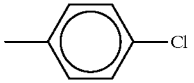 | 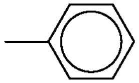 |
| 16 | 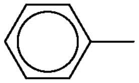 | 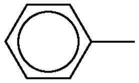 | 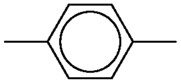 | 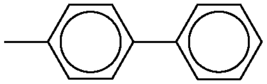 | 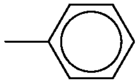 |
| 17 | 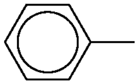 | 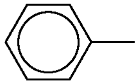 | 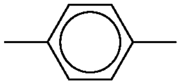 | 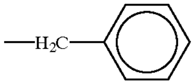 | 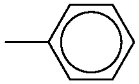 |
| 18 | 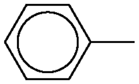 | 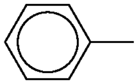 | 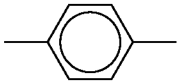 | 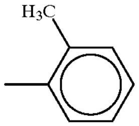 | 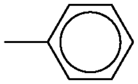 |
| 19 | 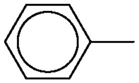 | 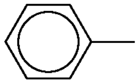 | 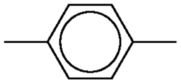 | 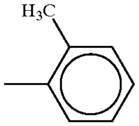 | 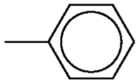 |
| 20 | 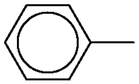 | 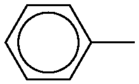 | 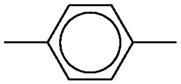 | 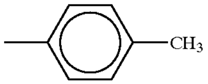 | 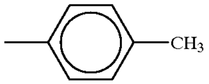 |
| 21 | 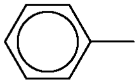 | 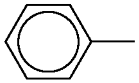 | 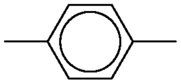 | 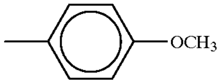 | 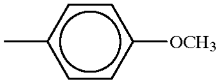 |

TABLE 2-continued
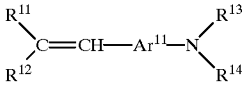
(II)
| No. | $R^{11}$ | $R^{12}$ | $Ar^{11}$ | $R^{13}$ | $R^{14}$ |
|---|---|---|---|---|---|
| 22 | 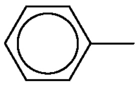 | 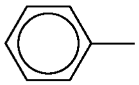 | 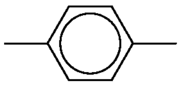 | 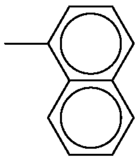 | 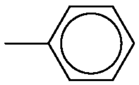 |
| 23 | 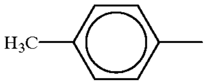 | 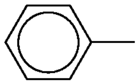 | 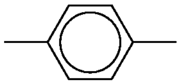 | 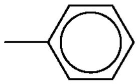 | 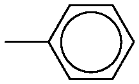 |
| 24 | 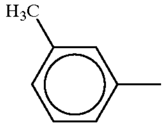 | 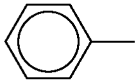 | 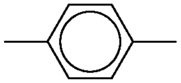 | 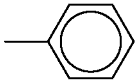 | 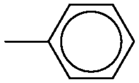 |
| 25 | 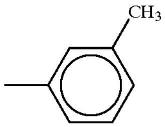 | 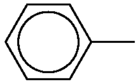 | 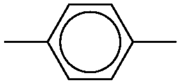 | 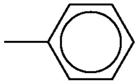 | 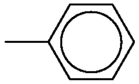 |
| 26 | 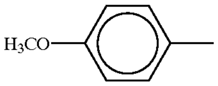 | 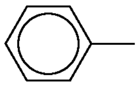 | 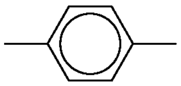 | 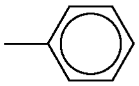 | 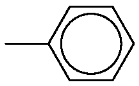 |
| 27 | 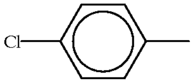 | 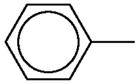 | 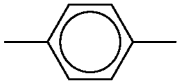 | 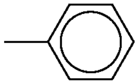 | 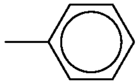 |

TABLE 2-continued
(II)
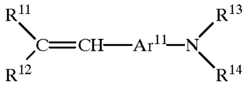
| No. | $R^{11}$ | $R^{12}$ | $Ar^{11}$ | $R^{13}$ | $R^{14}$ |
|---|---|---|---|---|---|
| 28 | 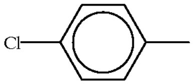 | 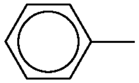 | 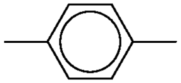 | 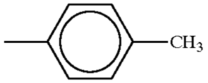 | 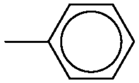 |
| 29 | 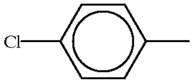 | 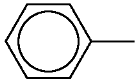 | 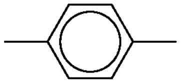 | 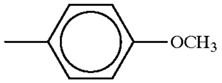 | 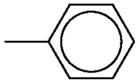 |
| 30 | 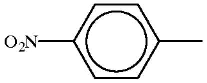 | 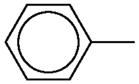 | 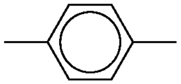 | 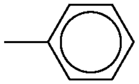 | 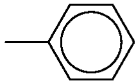 |
| 31 | 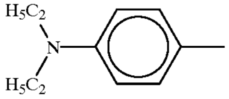 | 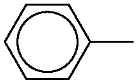 | 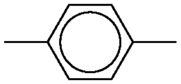 | 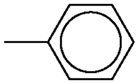 | 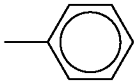 |
| 32 | 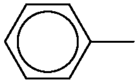 | 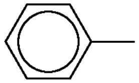 | 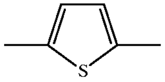 | 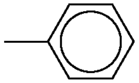 | 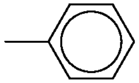 |
| 33 | 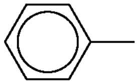 | 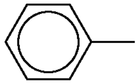 | 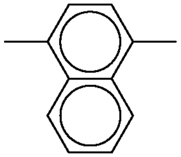 | 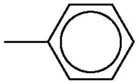 | 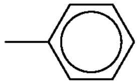 |

TABLE 2-continued
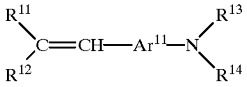
(II)
| No. | $R^{11}$ | $R^{12}$ | $Ar^{11}$ | $R^{13}$ | $R^{14}$ |
|---|---|---|---|---|---|
| 34 | 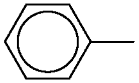 | H | 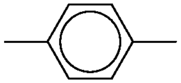 | 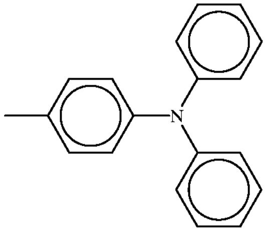 | 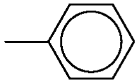 |
| 35 | 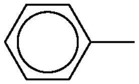 | 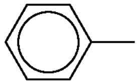 | 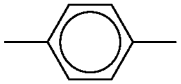 | 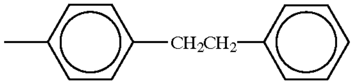 | 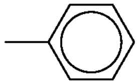 |
| 36 | 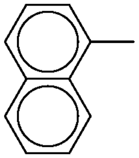 | H | 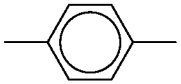 | 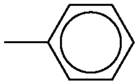 | 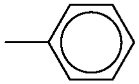 |
| 37 | | 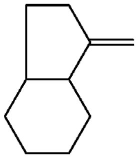 | 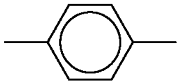 | 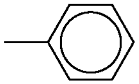 | 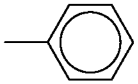 |

TABLE 2-continued
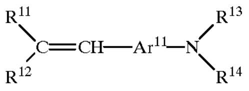
(II)
| No. | $R^{11}$ | $R^{12}$ | $Ar^{11}$ | $R^{13}$ | $R^{14}$ |
|---|---|---|---|---|---|
| 38 | | 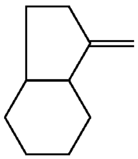 | 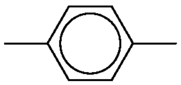 | 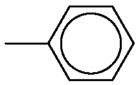 | 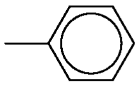 |
| 39 | | 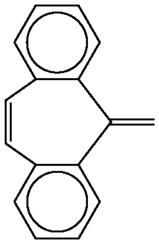 | 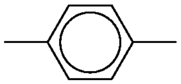 | 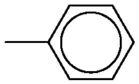 | 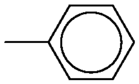 |
| 40 | | 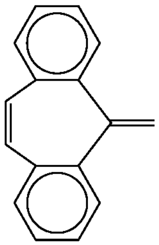 | 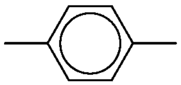 | 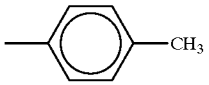 | 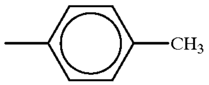 |
| 41 | 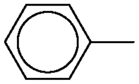 | 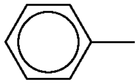 | 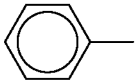 | $-C_2H_5$ | $-C_2H_5$ |

Specific examples of the positive hole transport material for use in the present invention are as follows:

(1) [Described in Japanese Laid-Open Patent Applications Nos. 55-154955 and 55-156954]

(1)

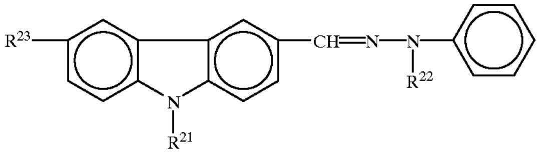

wherein $R^{21}$ is methyl group, ethyl group, 2-hydroxyethyl group, or 2-chloroethyl group; $R^{22}$ is methyl group, ethyl group, benzyl group, or phenyl group; and $R^{23}$ is a hydrogen atom, a chlorine atom, a bromine atom, an alkyl group having 1 to 4 carbon atoms, an alkoxyl group having 1 to 4 carbon atoms, a dialkylamino group, or nitro group.

Examples of the above compound of formula (1) are 9-ethylcarbazole-3-aldehyde-1-methyl-1-phenylhydrazone, 9-ethylcarbazole-3-aldehyde-1-benzyl-1-phenylhydrazone, and 9-ethylcarbazole-3-aldehyde-1,-diphenylhydrazone.

(2) [Described in Japanese Laid-Open Patent Application No. 55-52063]

(2)

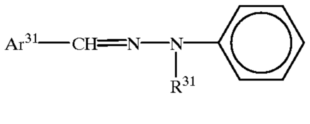

wherein $Ar^{31}$ is a naphthalene ring, anthracene ring or styryl ring, each of which may have a substituent, a pyridine ring, furan ring, or thiophene ring; and $R^{31}$ is an alkyl group or benzyl group.

Examples of the above compound of formula (2) are 4-diethylaminostyryl-β-aldehyde-1-methyl-1-phenylhydrazone, and 4-methoxynaphthalene-1-aldehyde-1-benzyl-1-phenylhydrazone.

(3) [Described in Japanese Laid-Open Patent Application No. 56-818501]

(3)

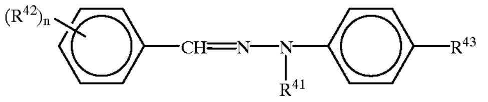

wherein $R^{41}$ is an alkyl group, benzyl group, phenyl group, or naphthyl group; $R^{42}$ is a hydrogen atom, an alkyl group having 1 to 3 carbon atoms, an alkoxyl group having 1 to 3 carbon atoms, a dialkylamino group, a diaralkylamino group, or a diarylamino group; n is an integer of 1 to 4, and when n is 2 or more, $R^{42}$ may be the same or different; and $R^{43}$ is a hydrogen atom or methoxy group.

Examples of the above compound of formula (3) are 4-methoxybenzaldehyde-1-methyl-1-phenylhydrazone, 2,4-dimethoxybenzaldehyde-1-benzyl-1-phenylhydrazone, 4-diethylaminobenzaldehyde-1,1-diphenylhydrazone, 4-methoxybenzaldehyde-1-(4-methoxy)phenylhydrazone, 4-diphenylaminobenzaldehyde-1-benzyl-1-phenylhydrazone, and 4-dibenzylaminobenzaldehyde-1,1-diphenylhydrazone.

(4) [Described in Japanese Patent Publication No. 51-10983]

(4)

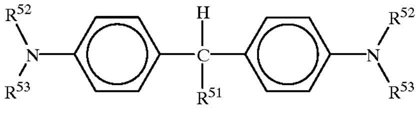

wherein $R^{51}$ is an alkyl group having 1 to 11 carbon atoms, a substituted or unsubstituted phenyl group, or a heterocyclic group; $R^{52}$ and $R^{53}$ are each independently a hydrogen atom, an alkyl group having 1 to 4 carbon atoms, a hydroxyalkyl group, chloroalkyl group, or a substituted or unsubstituted aralkyl group, and $R^{52}$ and $R^{53}$ may form a nitrogen-containing heterocyclic ring in combination; and $R^{54}$, which may be the same or different, each is a hydrogen atom, an alkyl group having 1 to 4 carbon atoms, an alkoxyl group, or a halogen atom.

Examples of the above compound of formula (4) are 1,1-bis(4-dibenzylaminophenyl)propane, tris(4-diethylaminophenyl)methane, 1,1-bis(4-dibenzylaminophenyl)-propane, and 2,2'-dimethyl-4,4'-bis(diethylamino)-triphenylmethane.

(5) [Described in Japanese Laid-Open Patent Application No. 51-94829]

(5)

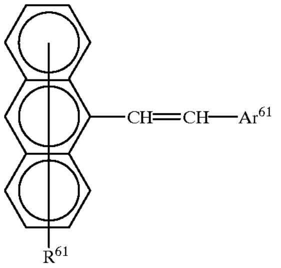

wherein $R^{61}$ is a hydrogen atom or a halogen atom; and $Ar^{61}$ is a substituted or unsubstituted phenyl group, naphthyl group, anthryl group, or carbazolyl group.

Examples of the above compound of formula (5) are 9-(4-diethylaminostyryl)anthracene, and 9-bromo-10-(4-diethylaminostyryl)anthracene.

(6) [Described in Japanese Laid-Open Patent Application No. 52-128373]

(6)

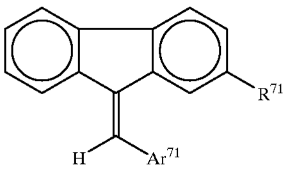

wherein $R^{71}$ is a hydrogen atom, a halogen atom, cyano group, an alkoxyl group having 1 to 4 carbon atoms, or an alkyl group having 1 to 4 carbon atoms; and $Ar^{71}$ is

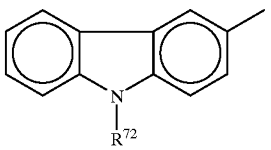

, or

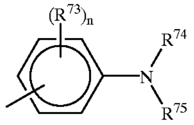

in which $R^{72}$ is an alkyl group having 1 to 4 carbon atoms; $R^{73}$ is a hydrogen atom, a halogen atom, an alkyl group having 1 to 4 carbon atoms, an alkoxyl group having 1 to 4 carbon atoms, or a dialkylamino group; n is an integer of 1 or 2, and when n is 2, $R^{73}$ may be the same or different; and $R^{74}$ and $R^{75}$ are each a hydrogen atom, a substituted or unsubstituted alkyl group having 1 to 4 carbon atoms, or a substituted or unsubstituted benzyl group.

Examples of the above compound of formula (6) are 9-(4-dimethylaminobenzylidene)fluorene, and 3-(9-fluorenylidene)-9-ethylcarbazole.

(7) [Described in Japanese Laid-Open Patent Application No. 56-29245]

(7)

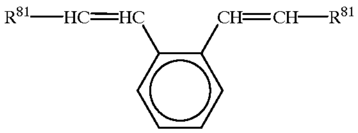

wherein $R^{81}$ is carbazolyl group, pyridyl group, thienyl group, indolyl group, furyl group, a substituted or unsubstituted phenyl group, a substituted or unsubstituted styryl group, a substituted or unsubstituted naphthyl group, or a substituted or unsubstituted anthryl group, each of which may have a substituent selected from the group consisting of a dialkylamino group, an alkyl group, an alkoxyl group, carboxyl group and an ester group thereof, a halogen atom, cyano group, an aralkylamino group, an N-alkyl-N-aralkylamino group, amino group, nitro group and acetylamino group.

Examples of the above compound of formula (7) are 1,2-bis(4-diethylaminostyryl)benzene, and 1,2-bis(2,4-dimethoxystyryl)benzene.

(8) [Described in Japanese Laid-Open Patent Application No. 58-58552]

(8)

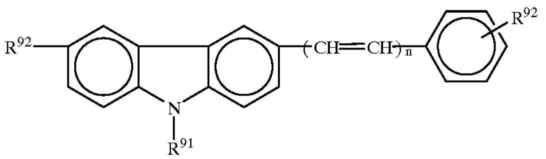

wherein $R^{91}$ is a lower alkyl group, a substituted or unsubstituted phenyl group, or benzyl group; $R^{92}$ is a hydrogen atom, a lower alkyl group, a lower alkoxyl group, a halogen atom, nitro group, or an amino group which may have as a substituent a lower alkyl group or benzyl group; and n is an integer of 1 or 2.

Examples of the above compound of formula (8) are 3-styryl-9-ethylcarbazole, and 3-(4-methoxystyryl)-9-ethylcarbazole.

(9) [Described in Japanese Laid-Open Patent Application No. 57-73075]

(9)

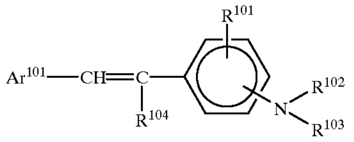

wherein $R^{101}$ is a hydrogen atom, an alkyl group, an alkoxyl group, or a halogen atom; $R^{102}$ and $R^{103}$ are each an alkyl group, a substituted or unsubstituted aralkyl group, or a substituted or unsubstituted aryl group; $R^{104}$ is a hydrogen atom, a lower alkyl group, or a substituted or unsubstituted phenyl group; and $Ar^{101}$ is a substituted or unsubstituted phenyl group, or a substituted or unsubstituted naphthyl group.

Examples of the above compound of formula (9) are 4-diphenylaminostilbene, 4-dibenzylaminostilbene, 4-ditolylaminostilbene, 1-(4-diphenylaminostyryl)naphthalene, and 1-(4-diethylaminostyryl)naphthalene.

(10) [Described in Japanese Laid-Open Patent Application No. 58-198043]

(10)

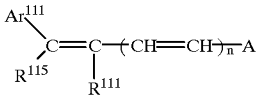

wherein n is an integer of 0 or 1, and when n=0, A and $R^{111}$ may form a ring in combination; $R^{111}$ is a hydrogen atom, an alkyl group, or a substituted or unsubstituted phenyl group; $Ar^{111}$ is a substituted or unsubstituted aryl group; $R^{115}$ is a substituted or unsubstituted alkyl group, or a substituted or unsubstituted aryl group; and A is 9-anthryl group, a substituted or unsubstituted carbazolyl group, or

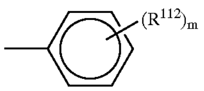

or

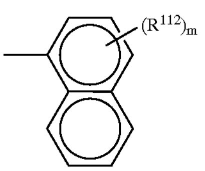

in which m is an integer of 0 to 3, and when m is 2 or more, $R^{112}$ may be the same or different; and $R^{112}$ is a hydrogen atom, an alkyl group, an alkoxyl group, a halogen atom, or

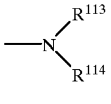

in which $R^{113}$ and $R^{114}$ are each independently an alkyl group, a substituted or unsubstituted aralkyl group, or a substituted or unsubstituted aryl group, and $R^{114}$ may form a ring in combination.

Examples of the above compound of formula (10) are 4'-diphenylamino-α-phenylstilbene, and 4'-bis(methylphenyl)amino-α-phenylstilbene.

(11) [Described in Japanese Laid-Open Patent Application No. 49-105537]

(11)

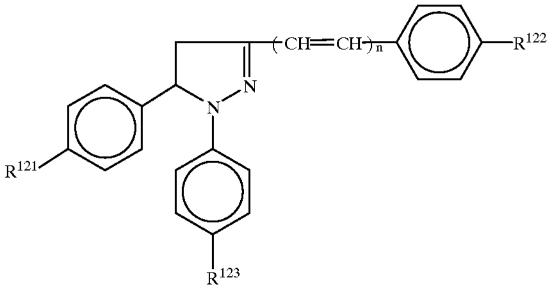

wherein $R^{121}$, $R^{122}$ and $R^{123}$ are each a hydrogen atom, a lower alkyl group, a lower alkoxyl group, a dialkylamino group, or a halogen atom; and n is an integer of 0 or 1.

Examples of the above compound of formula (11) include 1-phenyl-3-(4-diethylaminostyryl)-5-(4-diethylamino-phenyl)pyrazoline.

(12) [Described in Japanese Laid-Open Patent Application No. 52-139066]

(12)

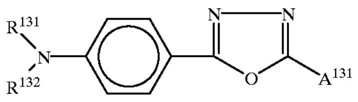

wherein $R^{131}$ and $R^{132}$ are each a substituted or unsubstituted alkyl group, or s substituted or unsubstituted aryl group; and $A^{131}$ is a substituted amino group, a substituted or unsubstituted aryl group, or an allyl group.

Examples of the above compound of formula (12) are 2,5-bis(4-diethylaminophenyl)-1,3,4-oxadiazole, 2-N,N-diphenylamino-5-(4-diethylaminophenyl)-1,3,4-oxadiazole, and 2-(4-dimethylaminophenyl)-5-(4-diethylaminophenyl)-1,3,4-oxadiazole.

(13) [Described in Japanese Laid-Open Patent Application No. 52-139065]

(13)

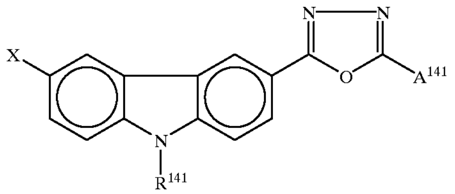

wherein X is a hydrogen atom, a lower alkyl group, or a halogen atom; $R^{141}$ is a substituted or unsubstituted alkyl group, or a substituted or unsubstituted aryl group; and $A^{141}$ is a substituted amino group, or a substituted or unsubstituted aryl group.

Examples of the above compound of formula (13) are 2-N,N-diphenylamino-5-(N-ethylcarbazol-3-yl)-1,3,4-oxadiazole, and 2-(4-diethylaminophenyl)-5-(N-ethylcarbazole-3-yl) -1,3,4-oxadiazole.

(14) [Described in Japanese Laid-Open Patent Application No. 58-32372]

(14)

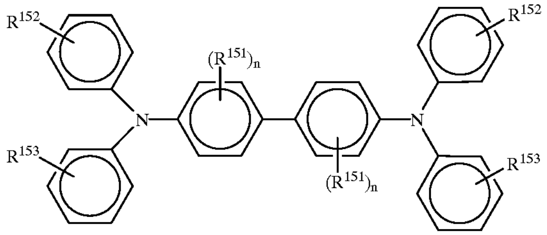

wherein $R^{151}$ is a lower alkyl group, a lower alkoxyl group, or a halogen atom; n is an integer of 0 to 4; and $R^{152}$ and $R^{153}$ are each independently a hydrogen atom, a lower alkyl group, a lower alkoxyl group, or a halogen atom.

Examples of the benzidine compound of formula (14) are N,N'-diphenyl-N,N'-bis(3-methylphenyl)-[1,1'-biphenyl]-4,4'-diamine, and 3,3'-dimethyl-N,N,N',N'-tetrakis(4-methylphenyl) -[1,1'-biphenyl]-4,4'-diamine.

(15) [Described in Japanese Laid-Open Patent Application No. 2-178669]

(15)

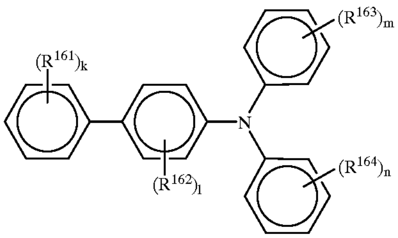

wherein $R^{161}$, $R^{163}$ and $R^{164}$ are each a hydrogen atom, amino group, an alkoxyl group, a thioalkoxyl group, an aryloxy group, methylenedioxy group, a substituted or unsubstituted alkyl group, a halogen atom, or a substituted or unsubstituted aryl group; $R^{162}$ is a hydrogen atom, an alkoxyl group, a substituted or unsubstituted alkyl group, or a halogen atom, provided $R^{161}$, $R^{162}$, $R^{163}$ and $R^{164}$ are not hydrogen atoms at the same time; and k, l, m and n are each an integer of 1 to 4, and when each is an integer of 2, 3 or 4, $R^{161}$, $R^{162}$, $R^{163}$ and $R^{164}$ may be independently the same or different.

Examples of the biphenylamine compound of formula (15) are 4'-methoxy-N,N-diphenyl-[1,1'-biphenyl]-4-amine, 4'-methyl-N,N-bis(4-methylphenyl)-[1,1'-biphenyl]-4-amine, and 4'-methoxy-N,N-bis(4-methylphenyl) -[1,1'-biphenyl]-4-amine.

(16) [Described in Japanese Laid-Open Patent Application No. 3-285960]

(16)

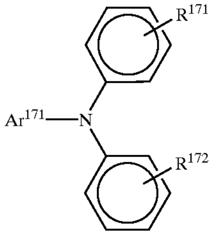

wherein $Ar^{171}$ is a condensed polycyclic hydrocarbon group having 18 or less carbon atoms; and $R^{171}$ and $R^{172}$ are each independently a hydrogen atom, a halogen atom, a substituted or unsubstituted alkyl group, an alkoxyl group, or a substituted or unsubstituted phenyl group.

Examples of the triarylamine compound of formula (16) are 1-diphenylaminopyrene, and 1-di(p-tolylamino)pyrene.

(17) [Described in Japanese Laid-Open Patent Application No. 62-98394]

$$A^{181}—CH{=}CH—Ar^{181}—CH{=}CH—A^{181} \quad (17)$$

wherein $Ar^{181}$ is a substituted or unsubstituted aromatic hydrocarbon group; and $A^{181}$ is

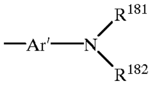

in which Ar' is a substituted or unsubstituted aromatic hydrocarbon group; and $R^{181}$ and $R^{182}$ are each a substituted or unsubstituted alkyl group, or a substituted or unsubstituted aryl group.

Examples of the diolefin aromatic compound of formula (17) are 1,4-bis(4-diphenylaminostyryl)benzene, and 1,4-bis[4-di(p-tolyl)aminostyryl]benzene.

(18) [Described in Japanese Laid-Open Patent Application No. 4-230764]

(18)

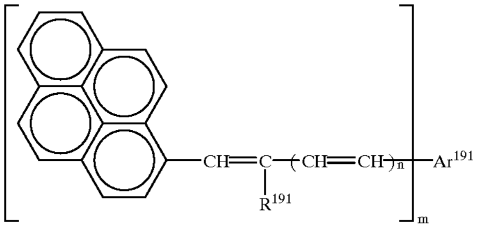

wherein $Ar^{191}$ is a substituted or unsubstituted aromatic hydrocarbon group; $R^{191}$ is a hydrogen atom, a substituted or unsubstituted alkyl group, or a substituted or unsubstituted aryl group; and n is an integer of 0 or 1, and m is an integer of 1 or 2, and when n=0 and m=1, $Ar^{191}$ and $R^{191}$ may form a ring in combination.

Examples of the styrylpyrene compound of formula (18) are 1-(4-diphenylaminostyryl)pyrene, and 1-[4-di(p-tolyl)aminostyryl]pyrene.

Examples of the electron transport material for use in the present invention are chloroanil, bromoanil, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-indeno4H-indeno[1,2-b]thiophene-4-one, and 1,3,7-trinitrodibenzothiophene-5,5-dioxide.

In particular, (2,3-diphenyl-1-indenylidene)malononitrile represented by the following formula (III), and electron transport materials represented by formulas (19) and (20) are preferably employed as the charge transport materials.

(III)

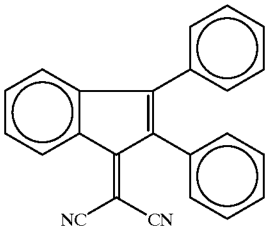

(19)

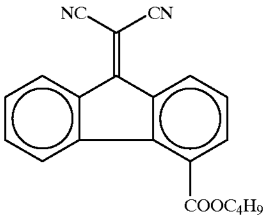

(20)

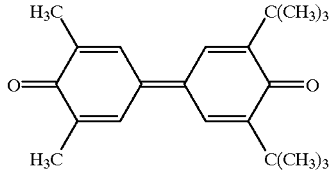

These charge transport materials may be used alone or in combination.

Other features of this invention will become apparent in the course of the following description of exemplary embodiments, which are given for illustration of the invention and are not intended to be limiting thereof.

Preparation Example 1

A mixture of 4.6 g (0.02 mol) of 2,3-diphenylmaleonitrile, 0.64 g (0.0067 mol) of copper(I) chloride, and 50 ml of α-chloronaphthalene was stirred, and gradually heated to 200° C. in a stream of nitrogen. With the reaction temperature being maintained in the range of 190 to 210° C., the reaction mixture was stirred for 5 hours to carry out the reaction.

After completion of the reaction, the reaction mixture was allowed to stand at room temperature, and subjected to column chromatography using silica gel. The thus obtained material was dried, whereby a Cu-tetraazaporphyrin pigment according to the present invention was obtained in a yield of 1.5 g (31%).

FIG. 1 is an IR spectrum of the thus obtained Cu-tetraazaporphyrin pigment.

Preparation Example 2

A mixture of 4.6 g (0.02 mol) of 2,3-diphenylmaleonitrile, 1.72 g (0.005 mol) of $Ti(OBu)_4$, and 20 ml of octanol was stirred, and gradually heated to 200° C. in a stream of nitrogen. With the reaction temperature being maintained in the range of 190 to 210° C., the reaction mixture was stirred for 5 hours to carry out the reaction.

After completion of the reaction, the reaction mixture was allowed to stand at room temperature, and subjected to column chromatography using silica gel. The thus obtained material was dried, so that a TiO-tetraazaporphyrin pigment according to the present invention was obtained in a yield of 1.4 g (28%).

Figure 2:
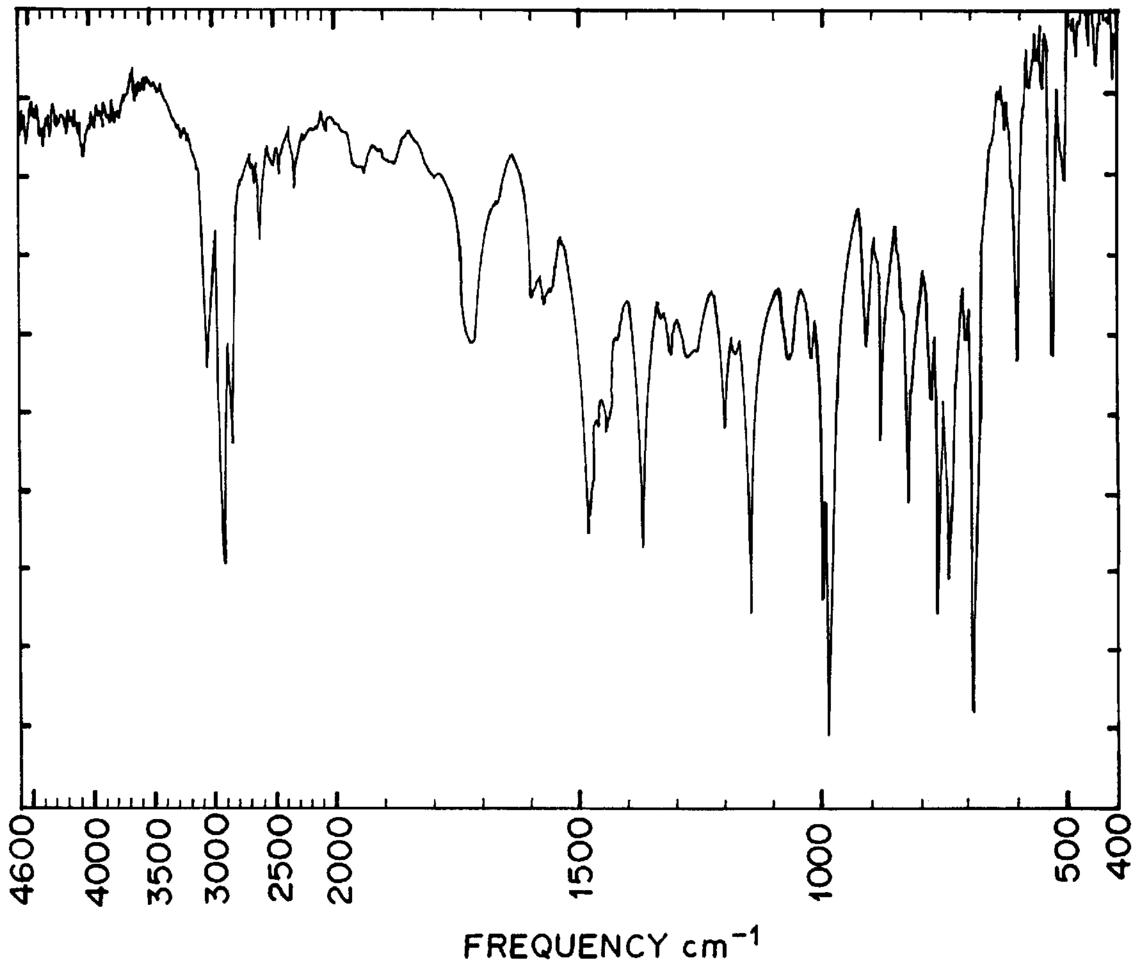
FIG. 2 is an IR spectrum of a tetraazaporphyrin pigment obtained in Preparation Example 2.

FIG. 2 is an IR spectrum of the thus obtained TiO-tetraazaporphyrin pigment.

EXAMPLE 1

[Fabrication of Laminated Type Photoconductor]

(Formation of Charge Generation Layer)

A mixture of one part by weight of the Cu-tetraazaporphyrin pigment obtained in Preparation Example 1, serving as a charge generation material, 50 parts by weight of a butyl acetate solution containing 2 wt. % of a commercially available polyvinyl butyral resin (Trademark "S-Lec BLS", made by Sekisui Chemical Co., Ltd.) and 49 parts by weight of n-butyl acetate was dispersed in a sand mill using 2-mm diameter glass beads for 2 hours.

Thus, a coating liquid for a charge generation layer was prepared.

The thus prepared charge generation layer coating liquid was coated on the aluminum surface of an aluminum-deposited PET film with a thickness of 75 μm serving as an electroconductive support, and dried at 80° C. for 5 minutes. Thus, a charge generation layer with a thickness of 0.2 μm was provided on the electroconductive support.

(Formation of Charge Transport Layer)

A mixture of 42 parts by weight of a charge transport material represented by the following formula (A), 60 parts by weight of a commercially available polycarbonate resin (Trademark "IUPILON Z200" made by Mitsubishi Gas Chemical Company, Inc.), and 0.001 parts by weight of a commercially available silicone oil (Trademark "KF50", made by Shin-Etsu Chemical Co., Ltd.) was dissolved in 638 parts by weight of dichloromethane, so that a coating liquid for a charge transport layer was prepared.

(A)

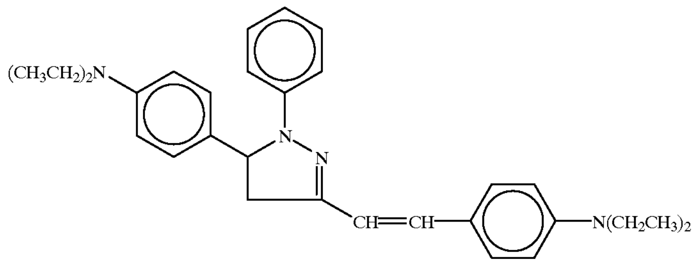

The thus prepared charge transport layer coating liquid was coated on the above prepared charge generation layer and dried at 80° C. for 5 minutes and then 110° C. for 10 minutes, so that a charge transport layer with a thickness of 20 μm was provided on the charge generation layer.

Thus, an electrophotographic photoconductor No. 1 according to the present invention was fabricated.

EXAMPLE 2

The procedure for fabrication of the electrophotographic photoconductor No. 1 in Example 1 was repeated except that the charge transport material of formula (A) for use in the charge transport layer coating liquid in Example 1 was replaced by the following charge transport material of formula (B):

(B)

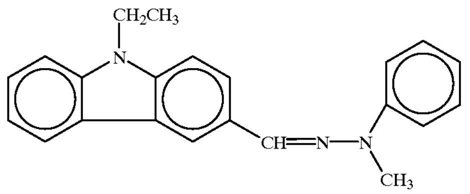

Thus, an electrophotographic photoconductor No. 2 according to the present invention was fabricated.

EXAMPLE 3

The procedure for fabrication of the electrophotographic photoconductor No. 1 in Example 1 was repeated except that the charge transport material of formula (A) for use in the charge transport layer coating liquid in Example 1 was replaced by the following charge transport material of formula (C):

(C)

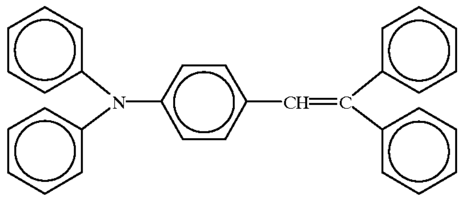

Thus, an electrophotographic photoconductor No. 3 according to the present invention was fabricated.

EXAMPLE 4

The procedure for fabrication of the electrophotographic photoconductor No. 1 in Example 1 was repeated except that the charge transport material of formula (A) for use in the charge transport layer coating liquid in Example 1 was replaced by the following charge transport material of formula (D):

(D)

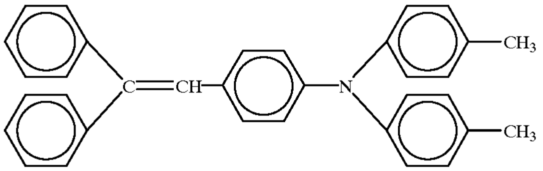

Thus, an electrophotographic photoconductor No. 4 according to the present invention was fabricated.

EXAMPLE 5

The procedure for fabrication of the electrophotographic photoconductor No. 1 in Example 1 was repeated except that the Cu-tetraazaporphyrin pigment (obtained in Preparation Example 1) for use in the coating liquid for the charge generation layer in Example 1 was replaced by the TiO-tetraazaporphyrin pigment obtained in Preparation Example 2.

Thus, an electrophotographic photoconductor No. 5 according to the present invention was fabricated.

EXAMPLE 6

The procedure for fabrication of the electrophotographic photoconductor No. 2 in Example 2 was repeated except that the Cu-tetraazaporphyrin pigment (obtained in Preparation Example 1) for use in the coating liquid for the charge generation layer in Example 2 was replaced by the TiO-tetraazaporphyrin pigment obtained in Preparation Example 2.

Thus, an electrophotographic photoconductor No. 6 according to the present invention was fabricated.

EXAMPLE 7

The procedure for fabrication of the electrophotographic photoconductor No. 3 in Example 3 was repeated except that the Cu-tetraazaporphyrin pigment (obtained in Preparation Example 1) for use in the coating liquid for the charge generation layer in Example 3 was replaced by the TiO-tetraazaporphyrin pigment obtained in Preparation Example 2.

Thus, an electrophotographic photoconductor No. 7 according to the present invention was fabricated.

EXAMPLE 8

The procedure for fabrication of the electrophotographic photoconductor No. 4 in Example 4 was repeated except that the Cu-tetraazaporphyrin pigment (obtained in Preparation Example 1) for use in the coating liquid for the charge generation layer in Example 4 was replaced by the TiO-tetraazaporphyrin pigment obtained in Preparation Example 2.

Thus, an electrophotographic photoconductor No. 8 according to the present invention was fabricated.

Each of the electrophotographic photoconductors No. 1 to No. 8 according to the present invention was charged negatively in the dark under application of −6 kV of corona charge for 20 seconds using a commercially available electrostatic copying sheet testing apparatus "Paper Analyzer Model EPA-8200" (Trademark), made by Kawaguchi Electro Works Co., Ltd.

Then, each photoconductor was allowed to stand in dark for 20 seconds without applying any charge thereto, and the surface potential Vo (−V) of the photoconductor was measured.

Each photoconductor was then illuminated by a light of 20 lux, and the exposure $E_{1/2}$ (lux·sec) required to reduce the initial surface potential Vo (−V) to ½ the initial surface potential Vo (−V) was measured.

The results are shown in TABLE 3.

TABLE 3

| Example No. | Photoconductor No. | Vo (−V) | $E_{1/2}$ (lux · sec) |
|---|---|---|---|
| 1 | 1 | 700 | 52.5 |
| 2 | 2 | 904 | 42.3 |
| 3 | 3 | 962 | 32.4 |
| 4 | 4 | 909 | 30.2 |
| 5 | 5 | 611 | 60.5 |
| 6 | 6 | 785 | 54.9 |
| 7 | 7 | 882 | 42.4 |
| 8 | 8 | 878 | 41.8 |

EXAMPLE 9

[Fabrication of Laminated Type Photoconductor]

(Formation of Charge Generation Layer)

A mixture of one part by weight of the Cu-tetraazaporphyrin pigment obtained in Preparation Example 1, serving as a charge generation material, 50 parts by weight of a butyl acetate solution containing 2 wt. % of a commercially available polyvinyl butyral resin (Trademark "S-Lec BLS", made by Sekisui Chemical Co., Ltd.) and 49 parts by weight of n-butyl acetate was dispersed in a sand mill using 2-mm diameter glass beads for 2 hours.

Thus, a coating liquid for a charge generation layer was prepared.

The thus prepared charge generation layer coating liquid was coated on the aluminum surface of an aluminum-deposited PET film with a thickness of 75 μm serving as an electroconductive support, and dried at 80° C. for 5 minutes. Thus, a charge generation layer with a thickness of 0.2 μm was provided on the electroconductive support.

(Formation of Charge Transport Layer)

A mixture of 8 parts by weight of an electron transport material represented by formula (III) as shown below, 11 parts by weight of a commercially available Z type polycarbonate resin (made by Teijin Chemicals Ltd.), and 0.02 parts by weight of a commercially available silicone oil (Trademark "KF50", made by Shin-Etsu Chemical Co., Ltd.) was dissolved in 91 parts by weight of tetrahydrofuran, so that a coating liquid for a charge transport layer was prepared.

(III)

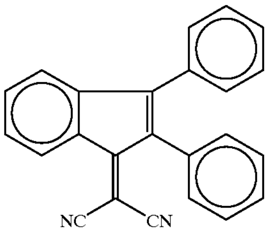

The thus prepared charge transport layer coating liquid was coated on the above prepared charge generation layer using a doctor blade and dried, so that a charge transport layer with a thickness of 20 μm was provided on the charge generation layer.

Thus, an electrophotographic photoconductor No. 9 according to the present invention was fabricated.

EXAMPLE 10

The procedure for fabrication of the electrophotographic photoconductor No. 9 in Example 9 was repeated except that the electron transport material of formula (III) for use in the charge transport layer coating liquid in Example 9 was replaced by the following electron transport material of formula (19):

(19)

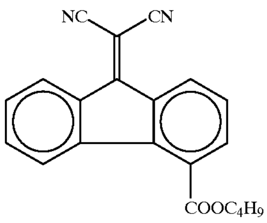

Thus, an electrophotographic photoconductor No. 10 according to the present invention was fabricated.

EXAMPLE 11

The procedure for fabrication of the electrophotographic photoconductor No. 9 in Example 9 was repeated except that the electron transport material of formula (III) for use in the charge transport layer coating liquid in Example 9 was replaced by the following electron transport material of formula (20):

(20)

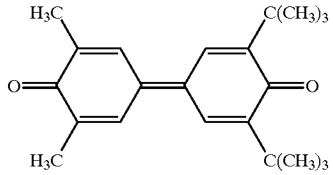

Thus, an electrophotographic photoconductor No. 11 according to the present invention was fabricated.

Each of the electrophotographic photoconductors No. 9 to No. 11 according to the present invention was charged positively in the dark under application of +5.3 kV of corona charge for 20 seconds using a commercially available electrostatic copying sheet testing apparatus "Paper Analyzer Model EPA-8200" (Trademark), made by Kawaguchi Electro Works Co., Ltd.

Then, each photoconductor was allowed to stand in the dark for 20 seconds without applying any charge thereto, and the surface potential Vo (V) of the photoconductor was measured.

Each photoconductor was then illuminated by a light of 20 lux, and the exposure $E_{1/2}$ (lux·sec) required to reduce the initial surface potential Vo (V) to ½ the initial surface potential Vo (V) was measured.

The results are shown in TABLE 4.

TABLE 4

| Example No. | Photoconductor No. | Vo (V) | $E_{1/2}$ (lux · sec) |
|---|---|---|---|
| 9 | 9 | 794 | 51.6 |
| 10 | 10 | 756 | 51.8 |
| 11 | 11 | 743 | 49.8 |

EXAMPLE 12

[Fabrication of Single-layered Type Photoconductor]

(Formation of Single-layered Photoconductive Layer)

A mixture of 0.5 g of the Cu-tetraazaporphyrin pigment obtained in Preparation Example 1, serving as a charge generation material, 10 g of a solution prepared by dissolving a commercially available Z type polycarbonate resin (made by Teijin Chemicals Ltd.) in tetrahydrofuran so as to have a concentration of 10 wt. %, and 9 g of tetrahydrofuran was dispersed in a ball mill.

Thereafter, a tetrahydrofuran solution containing 10 wt. % of the Z type polycarbonate resin and a charge transport material of formula (D) were further added to the above-mentioned dispersion so that the amount ratio of pigment might be 2 wt. %, that of Z type polycarbonate resin be 50 wt. %, and that of charge transport material be 28 wt. %.

(D)

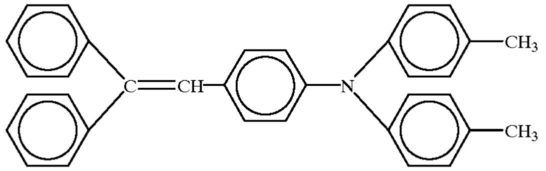

The thus obtained mixture was thoroughly stirred, so that a coating liquid for a photoconductive layer was prepared.

The thus prepared photoconductive layer coating liquid was coated on the aluminum surface of an aluminum-deposited polyester film serving as an electroconductive support using a doctor blade, and dried. Thus, a photoconductive layer with a thickness of 15 μm was provided on the electroconductive support.

Thus, an electrophotographic photoconductor No. 12 of a single-layered type according to the present invention was fabricated.

EXAMPLE 13

The procedure for fabrication of the electrophotographic photoconductor No. 12 in Example 12 was repeated except that the Cu-tetraazaporphyrin pigment (obtained in Preparation Example 1) for use in the coating liquid for the photoconductive layer in Example 12 was replaced by the TiO-tetraazaporphyrin pigment obtained in Preparation Example 2.

Thus, an electrophotographic photoconductor No. 13 of a single-layered type according to the present invention was fabricated.

Each of the electrophotographic photoconductors No. 12 and No. 13 according to the present invention was charged positively in the dark under application of +6 kV of corona charge for 20 seconds using a commercially available electrostatic copying sheet testing apparatus "Paper Analyzer Model EPA-8200" (Trademark), made by Kawaguchi Electro Works Co., Ltd.

Then, each photoconductor was allowed to stand in the dark for 20 seconds without applying any charge thereto, and the surface potential Vo (V) of the photoconductor was measured.

Each photoconductor was then illuminated by a light of 20 lux, and the exposure $E_{1/2}$ (lux·sec) required to reduce the initial surface potential Vo (V) to ½ the initial surface potential Vo (V) was measured.

The results are shown in TABLE 5.

TABLE 5

| Example No. | Photoconductor No. | Vo (V) | $E_{1/2}$ (lux · sec) |
|---|---|---|---|
| 12 | 12 | 782 | 42.3 |
| 13 | 13 | 722 | 46.5 |

Preparation Example 3

A mixture of 4.6 g (0.02 mol) of 2,3-diphenylmaleonitrile, 0.64 g (0.0067 mol) of copper(I) chloride, and 50 ml of α-chloronaphthalene was stirred, and gradually heated to 200° C. in a stream of nitrogen. With the reaction temperature being maintained in the range of 190 to 210° C., the reaction mixture was stirred for 5 hours to carry out the reaction.

After completion of the reaction, the reaction mixture was allowed to stand at room temperature. When the temperature of the reaction mixture was decreased to 130° C., the reaction mixture was subjected to filtration. The resultant residue was washed with α-chloronaphthalene, and in addition, washed with hot water of 80° C. several times, and then dried. Thus, a Cu-tetraazaporphyrin pigment according to the present invention was obtained in a yield of 1.5 g (31%)

The results of the elemental analysis of the above-mentioned Cu-tetraazaporphyrin pigment were as follows:

| | % C | % H | % N |
|---|---|---|---|
| Found | 77.92 | 3.80 | 11.14 |
| Calculated | 78.06 | 4.09 | 11.38 |

Figure 3:
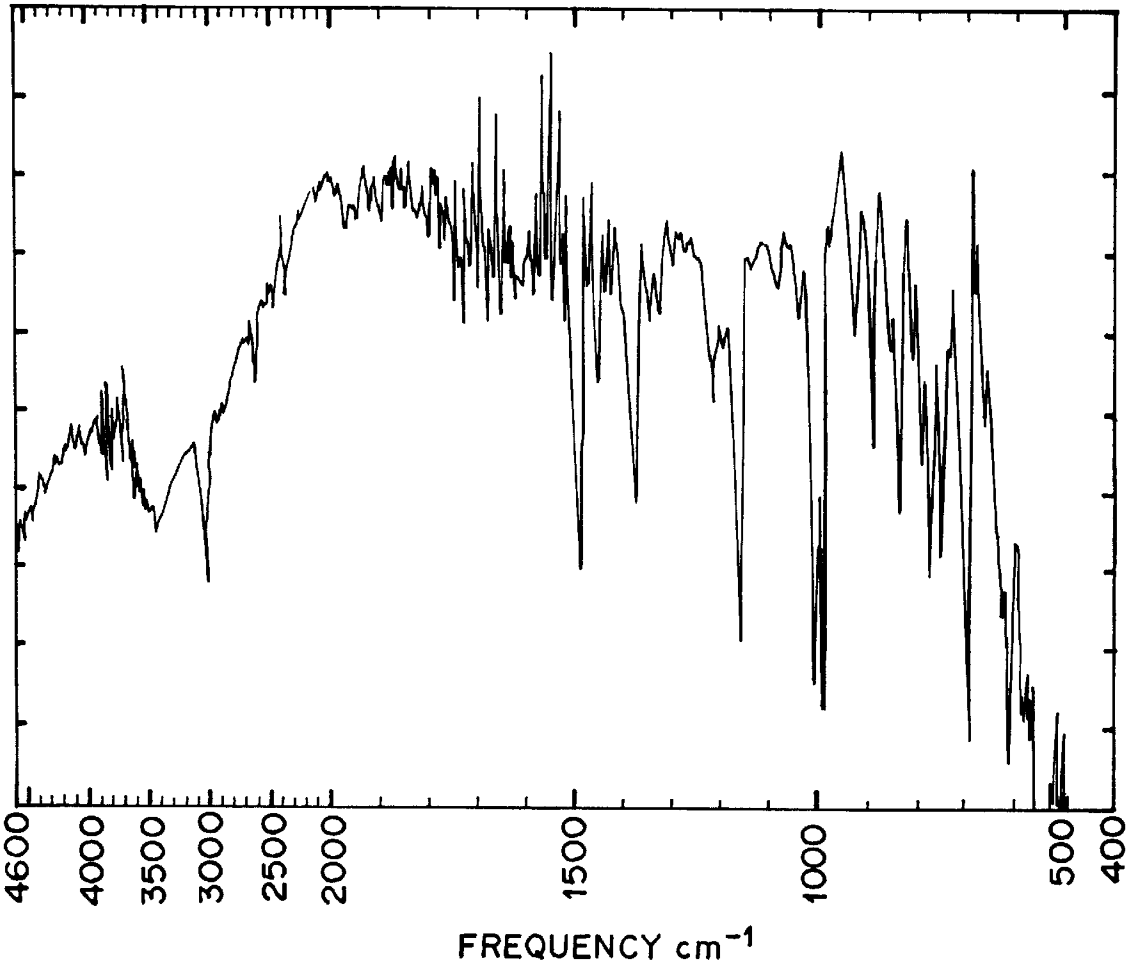
FIG. 3 is an IR spectrum of a tetraazaporphyrin pigment obtained in Preparation Example 3.

FIG. 3 is an IR spectrum of the thus obtained Cu-tetraazaporphyrin pigment.

Preparation Example 4

3 g of the Cu-tetraazaporphyrin pigment synthesized in Preparation Example 3 was gradually dissolved in 60 g of 98% sulfuric acid at 5° C.

The thus obtained mixture was stirred for about one hour with the temperature being maintained at 5° C. or less. Thereafter, the obtained sulfuric acid solution was slowly poured into 800 ml of ice-cold water which was vigorously stirred. The resultant precipitated crystals were collected by filtration. The thus obtained crystals were thoroughly washed with distilled water until the filtrate became neutral, and then dried, so that 2.9 g of a Cu-tetraazaporphyrin pigment according to the present invention was obtained in a crystalline form.

Preparation Example 5

1 g of the Cu-tetraazaporphyrin pigment obtained in Preparation Example 4 was placed into a 200-ml conical flask, and refluxed with stirring for 8 hours together with 50 ml of methanol under application of heat thereto.

Thereafter, the above-mentioned mixture was cooled to room temperature and subjected to filtration. The resultant residue was dried, so that 0.97 g of a Cu-tetraazaporphyrin pigment according to the present invention was obtained in a crystalline form.

Preparation Example 6

1 g of the Cu-tetraazaporphyrin pigment obtained in Preparation Example 4 was placed into a 200-ml conical flask, and refluxed with stirring for 8 hours together with 50 ml of cyclohexanone under application of heat thereto.

Thereafter, the above-mentioned mixture was cooled to room temperature and subjected to filtration. The resultant residue was dried, so that 0.97 g of a Cu-tetraazaporphyrin pigment according to the present invention was obtained in a crystalline form.

Preparation Example 7

1 g of the Cu-tetraazaporphyrin pigment obtained in Preparation Example 4 was placed into a 200-ml conical flask, and refluxed with stirring for 8 hours together with 50 ml of tetrahydrofuran under application of heat thereto.

Thereafter, the above-mentioned mixture was cooled to room temperature and subjected to filtration. The resultant residue was dried, so that 0.91 g of a Cu-tetraazaporphyrin pigment according to the present invention was obtained in a crystalline form.

Preparation Example 8

1 g of the Cu-tetraazaporphyrin pigment obtained in Preparation Example 4 was placed into a 200-ml conical flask, and refluxed with stirring for 8 hours together with a mixed solvent of 36 ml of methyl ethyl ketone and 4 ml of water under application of heat thereto.

Thereafter, the above-mentioned mixture was cooled to room temperature and subjected to filtration. The resultant residue was dried, so that 0.93 g of a Cu-tetraazaporphyrin pigment according to the present invention was obtained in a crystalline form.

Preparation Example 9

1g of the Cu-tetraazaporphyrin pigment obtained in Preparation Example 4 was placed into a 200-ml conical flask, and refluxed with stirring for 8 hours together with 50 ml of N,N-dimethylformamide under application of heat thereto.

Thereafter, the above-mentioned mixture was cooled to room temperature and subjected to filtration. The resultant residue was dried, so that 0.93 g of a Cu-tetraazaporphyrin pigment according to the present invention was obtained in a crystalline form.

Preparation Example 10

1g of the Cu-tetraazaporphyrin pigment obtained in Preparation Example 4 was placed into a 200-mi conical flask, and refluxed with stirring for 8 hours together with 50 ml of nitrobenzene under application of heat thereto.

Thereafter, the above-mentioned mixture was cooled to room temperature and subjected to filtration. The resultant residue was dried, so that 0.97 g of a Cu-tetraazaporphyrin pigment according to the present invention was obtained in a crystalline form.

Preparation Example 11

1 g of the Cu-tetraazaporphyrin pigment obtained in Preparation Example 3 was dissolved in a mixed solvent of 2 ml of trifluoroacetic acid and 8 ml of dichloromethane. The thus obtained solution was added dropwise to a mixed solvent of 25 ml of tetrahydrofuran and 25 ml of water which was cooled to 5° C. on an ice bath, with stirring, so that crystals were precipitated. The thus obtained mixture was further stirred for 30 minutes, and thereafter allowed to stand.

After the crystals were allowed to settle, the supernatant solution was removed. With the addition of 50 ml of methanol to the above-prepared crystals, the mixture was stirred for 30 minutes and subjected to filtration. The resultant residue in the form of a solid material was dispersed in 10 ml of hot water and filtered off several times, so that a wet cake of the Cu-tetraazaporphyrin pigment was obtained.

The thus obtained wet cake was washed with methanol and dried, whereby 0.95 g of a Cu-tetraazaporphyrin pigment according to the present invention was obtained.

Preparation Example 12

A mixture of 4.6 g (0.02 mol) of 2,3-diphenylmaleonitrile, 1.72 g (0.005 mol) of $Ti(OBu)_4$, and 20 ml of octanol was stirred, and gradually heated to 200° C. in a stream of nitrogen. With the reaction temperature being maintained in the range of 190 to 210° C., the reaction mixture was stirred for 5 hours to carry out the reaction.

After completion of the reaction, the reaction mixture was allowed to stand at room temperature. When the temperature of the reaction mixture was decreased to 130° C., the reaction mixture was subjected to filtration. The resultant residue was washed with octanol, and in addition, washed with hot water of 80° C. several times, and then dried. Thus, a TiO-tetraazaporphyrin pigment according to the present invention was obtained in a yield of 1.4 g (28%).

The results of the elemental analysis of the above-mentioned TiO-tetraazaporphyrin pigment were as follows:

| | % C | % H | % N |
|---|---|---|---|
| Found | 77.89 | 3.91 | 11.21 |
| Calculated | 78.04 | 4.09 | 11.38 |

Figure 4:
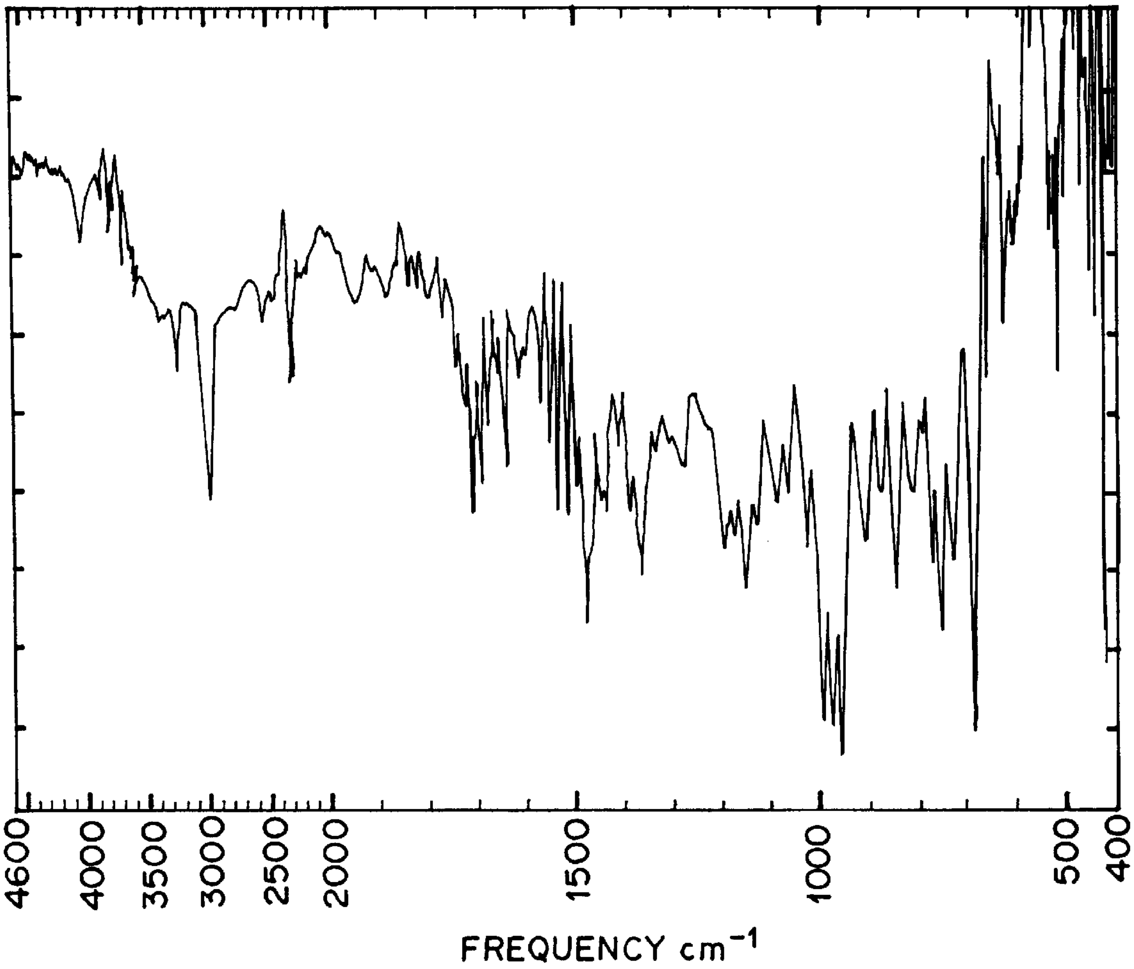
FIG. 4 is an IR spectrum of a tetraazaporphyrin pigment obtained in Preparation Example 12.
Figure 5:
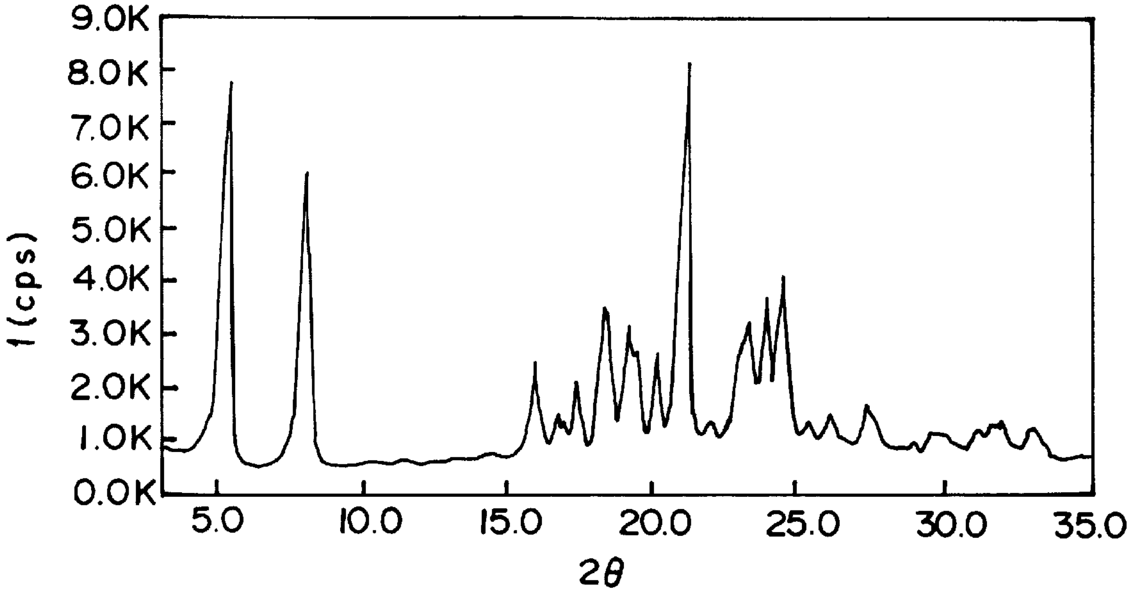
FIGS. 5 through 13 are X-ray diffraction spectra of tetraazaporphyrin pigments obtained in Preparation Examples 3 through 11, respectively.
Figure 6:
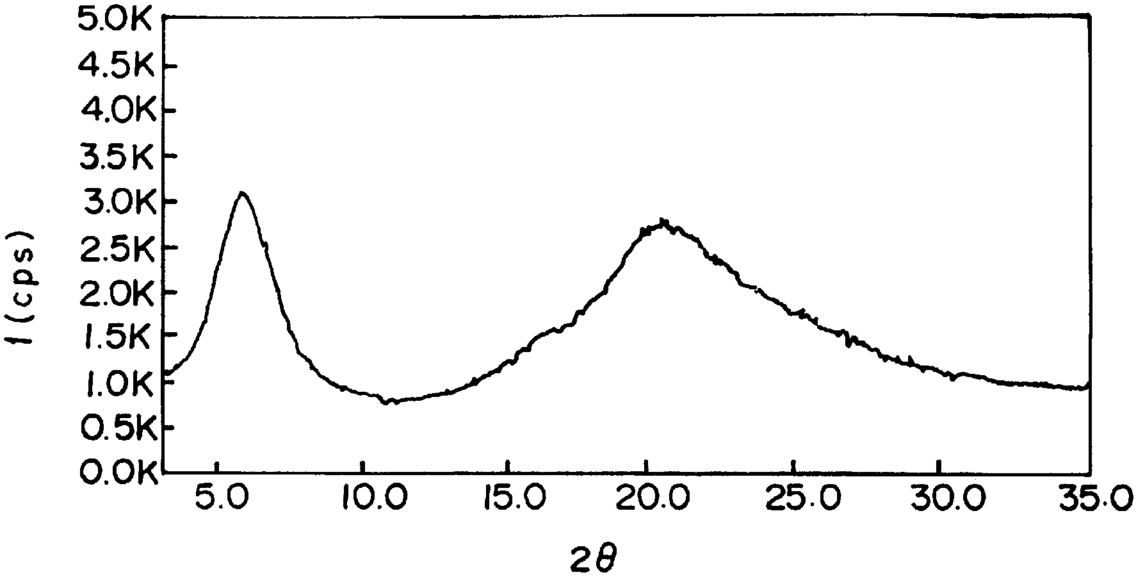
Figure 7:
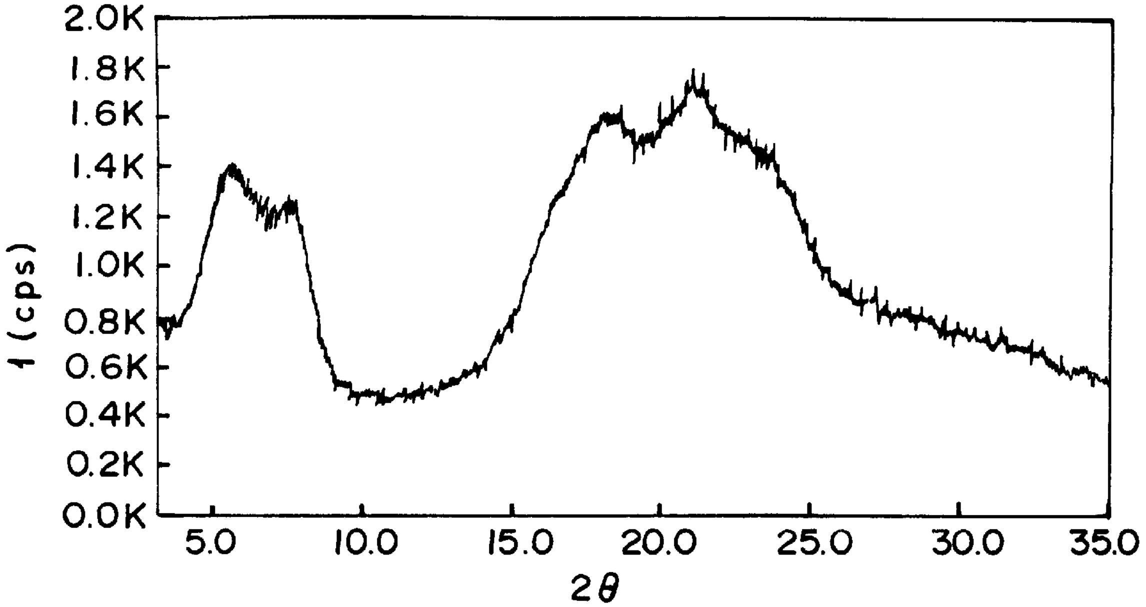
Figure 8:
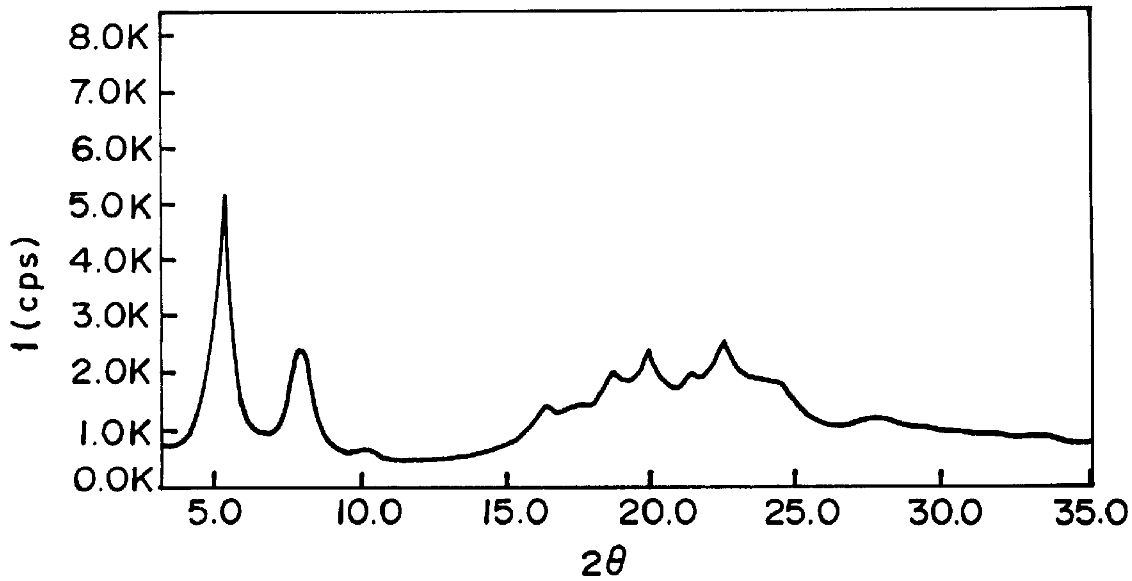
Figure 9:
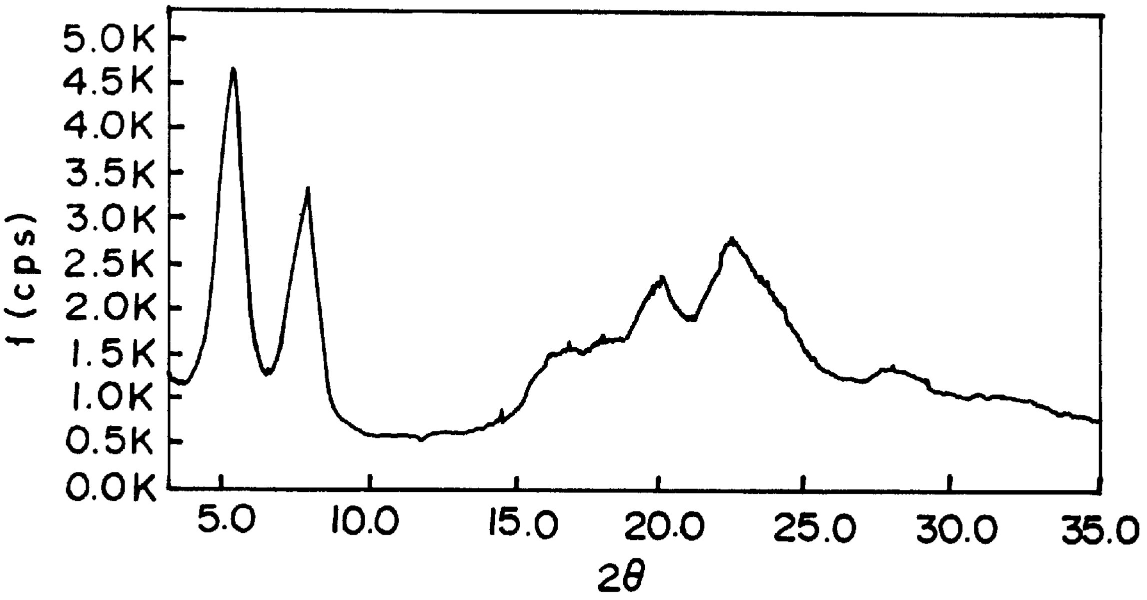
Figure 10:
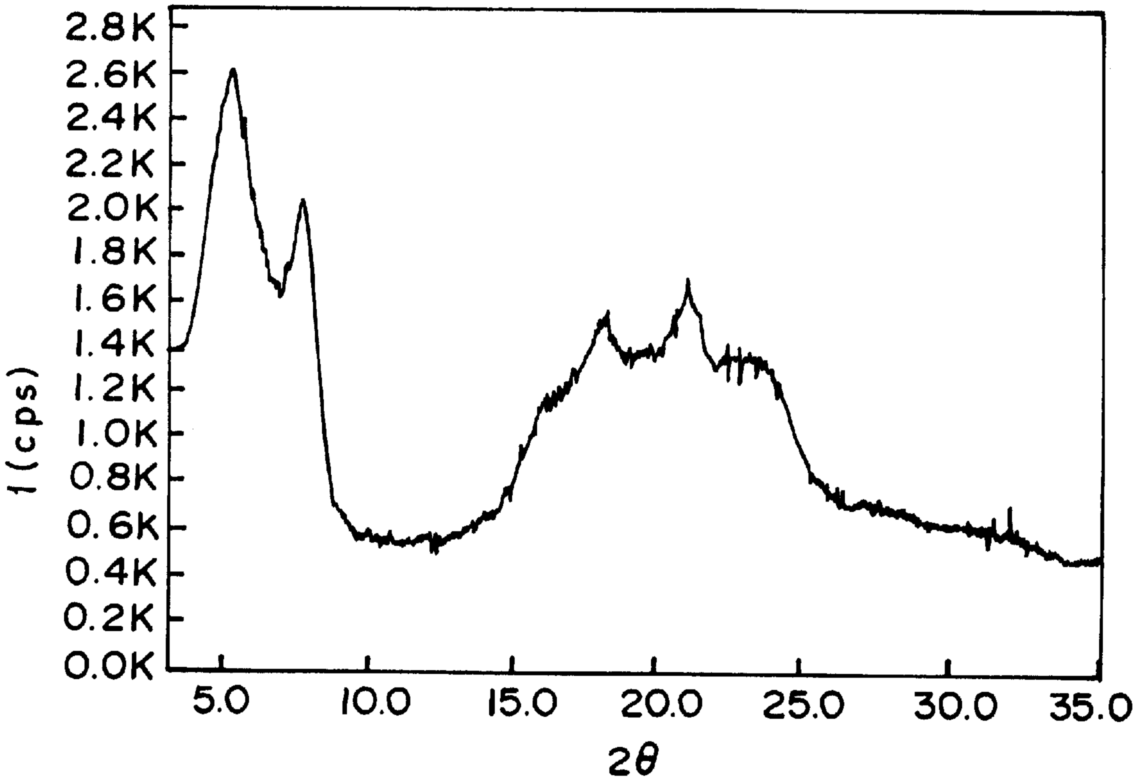
Figure 11:
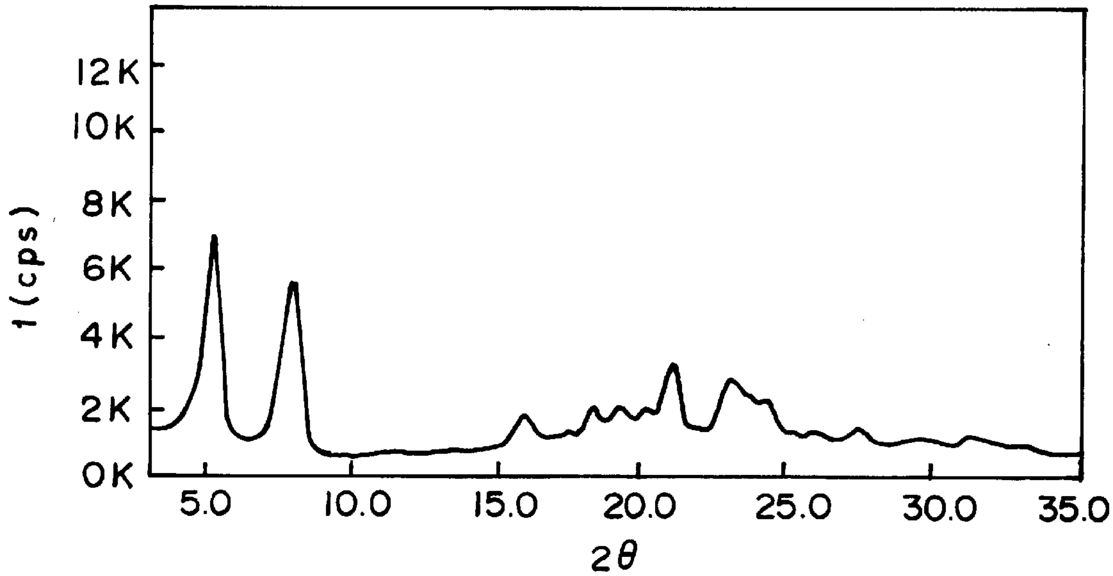
Figure 12:
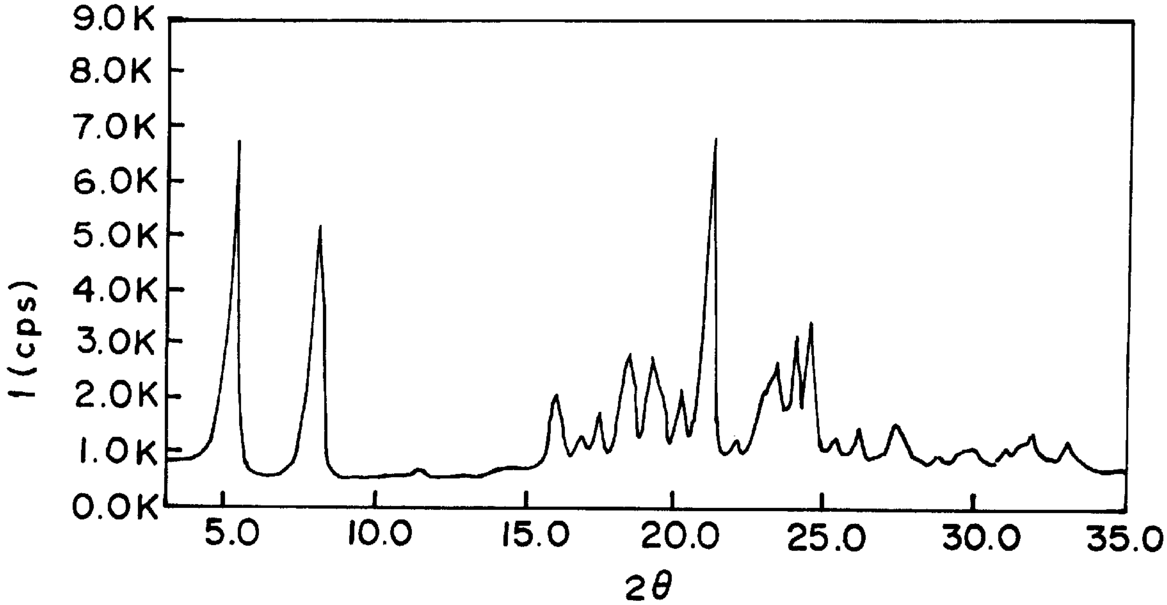
Figure 13:
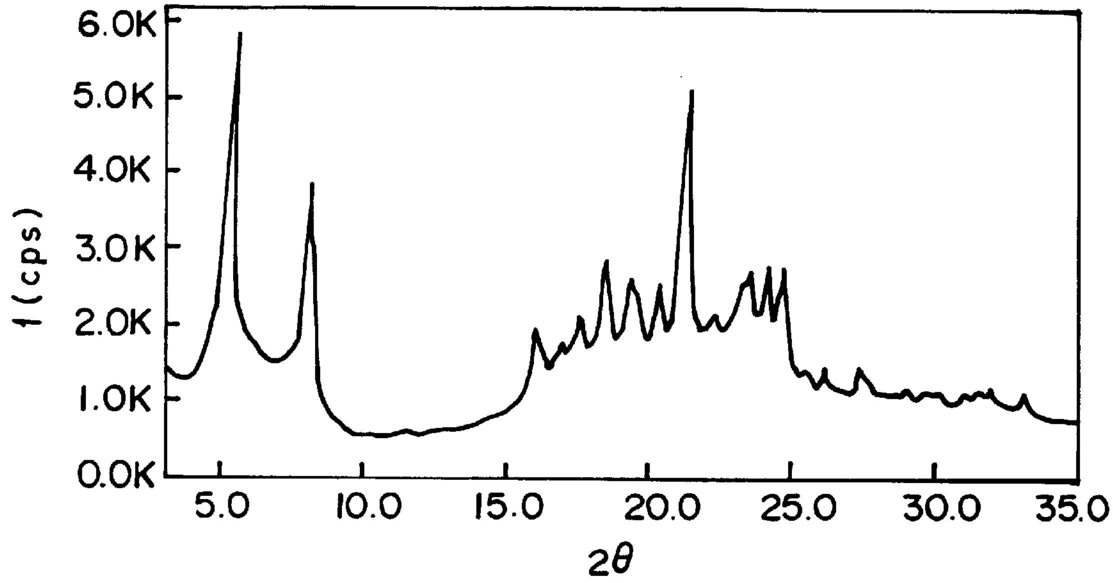

FIG. 4 is an IR spectrum of the thus obtained TiO-tetraazaporphyrin pigment.

Preparation Example 13

4 g of the TiO-tetraazaporphyrin pigment obtained in Preparation Example 12 was gradually dissolved in 80 g of 98% sulfuric acid at 5° C.

The thus obtained mixture was stirred for about one hour with the temperature being maintained at 5° C. or less. Thereafter, the obtained sulfuric acid solution was slowly poured into 800 ml of ice-cold water which was vigorously stirred. The resultant precipitated crystals were collected by filtration. The thus obtained crystals were thoroughly washed with distilled water until the filtrate became neutral, recrystallized from acetone, and then dried, so that 3.6 g of a TiO-tetraazaporphyrin pigment according to the present invention was obtained in a crystalline form.

Preparation Example 14

4 g of the TiO-tetraazaporphyrin pigment obtained in Preparation Example 13 was placed into a 500-ml conical flask, and refluxed with stirring for 8 hours together with 200 ml of methanol under application of heat thereto.

Thereafter, the above-mentioned mixture was cooled to room temperature and subjected to filtration. The resultant residue was dried, so that 3.95 g of a TiO-tetraazaporphyrin pigment according to the present invention was obtained in a crystalline form.

Preparation Example 15

4 g of the TiO-tetraazaporphyrin pigment obtained in Preparation Example 13 was placed into a 500-ml conical flask, and refluxed with stirring for 8 hours together with 200 ml of cyclohexanone under application of heat thereto.

Thereafter, the above-mentioned mixture was cooled to room temperature and subjected to filtration. The resultant residue was dried, so that 3.95 g of a TiO-tetraazaporphyrin pigment according to the present invention was obtained in a crystalline form.

Each of the tetraazaporphyrin pigments obtained in Preparation Examples 3, 4, 5, 6, 7, 8, 9, 10 and 11 was subjected to measurement of the X-ray diffraction spectrum under the following conditions:

| | |
|---|---|
| X-ray tube | Cu (with a wavelength of 1.54 Å) |
| Voltage | 45 kV |
| Current | 40 mA |
| Scanning speed | 1 deg/min |
| Scanning scope | 3–35 deg |
| Time constant | 2 sec |

FIGS. 5 to 13 are X-ray diffraction spectra of the above-mentioned tetraazaporphyrin pigments prepared in Preparation Examples 3 to 11, respectively. In any case, it was confirmed that the tetraazaporphyrin pigment exhibited a major diffraction peak at 21.2° in terms of a Bragg angle 2θ±0.2° in the X-ray diffraction spectrum using the Cu—Kα ray.

EXAMPLE 14

[Fabrication of Laminated Type Photoconductor]

(Formation of Charge Generation Layer)

A mixture of one part by weight of the Cu-tetraazaporphyrin pigment obtained in Preparation Example 3, serving as a charge generation material, 50 parts by weight of butyl acetate solution containing 2 wt. % of a commercially available polyvinyl butyral resin (Trademark "BM-S", made by Sekisui Chemical Co., Ltd.) and 49 parts by weight of n-butyl acetate was dispersed in a sand mill using 2-mm diameter glass beads for 2 hours.

Thus, a coating liquid for a charge generation layer was prepared.

The thus prepared charge generation layer coating liquid was coated on the aluminum surface of an aluminum-deposited PET film with a thickness of 75 μm serving as an electroconductive support, and dried at 80° C. for 5 minutes. Thus, a charge generation layer with a thickness of 0.2 μm was provided on the electroconductive support.

(Formation of Charge Transport Layer)

A mixture of 42 parts by weight of a positive hole transport material represented by the following formula (D), 60 parts by weight of a commercially available polycarbonate resin (Trademark "IUPILON Z200" made by Mitsubishi Gas Chemical Company, Inc.), and 0.001 parts by weight of a commercially available silicone oil (Trademark "KF50", made by Shin-Etsu Chemical Co., Ltd.) was dissolved in 638 parts by weight of dichloromethane, so that a coating liquid for a charge transport layer was prepared.

(D)

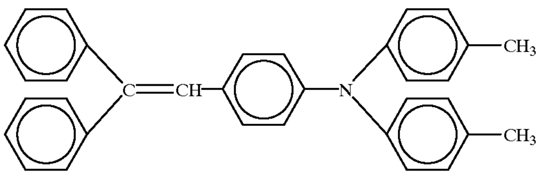

The thus prepared charge transport layer coating liquid was coated on the above prepared charge generation layer and dried at 80° C. for 5 minutes and then 110° C. for 10 minutes, so that a charge transport layer with a thickness of 20 μm was provided on the charge generation layer.

Thus, an electrophotographic photoconductor No. 14 according to the present invention was fabricated.

EXAMPLE 15

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 4.

Thus, an electrophotographic photoconductor No. 15 according to the present invention was fabricated.

EXAMPLE 16

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 5.

Thus, an electrophotographic photoconductor No. 16 according to the present invention was fabricated.

EXAMPLE 17

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 6.

Thus, an electrophotographic photoconductor No. 17 according to the present invention was fabricated.

EXAMPLE 18

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 7.

Thus, an electrophotographic photoconductor No. 18 according to the present invention was fabricated.

EXAMPLE 19

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 8.

Thus, an electrophotographic photoconductor No. 19 according to the present invention was fabricated.

EXAMPLE 20

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 9.

Thus, an electrophotographic photoconductor No. 20 according to the present invention was fabricated.

EXAMPLE 21

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 10.

Thus, an electrophotographic photoconductor No. 21 according to the present invention was fabricated.

EXAMPLE 22

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the Cu-tetraazaporphyrin pigment obtained in Preparation Example 11.

Thus, an electrophotographic photoconductor No. 22 according to the present invention was fabricated.

EXAMPLE 23

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the TiO-tetraazaporphyrin pigment obtained in Preparation Example 12.

Thus, an electrophotographic photoconductor No. 23 according to the present invention was fabricated.

EXAMPLE 24

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the TiO-tetraazaporphyrin pigment obtained in Preparation Example 13.

Thus, an electrophotographic photoconductor No. 24 according to the present invention was fabricated.

EXAMPLE 25

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the TiO-tetraazaporphyrin pigment obtained in Preparation Example 14.

Thus, an electrophotographic photoconductor No. 25 according to the present invention was fabricated.

EXAMPLE 26

The procedure for fabrication of the electrophotographic photoconductor No. 14 in Example 14 was repeated except that the Cu-tetraazaporphyrin pigment (obtained in Preparation Example 3) for use in the coating liquid for the charge generation layer in Example 14 was replaced by the TiO-tetraazaporphyrin pigment obtained in Preparation Example 15.

Thus, an electrophotographic photoconductor No. 26 according to the present invention was fabricated.

EXAMPLE 27

The procedure for fabrication of the electrophotographic photoconductor No. 14 in Example 14 was repeated except that the positive hole transport material of formula (D) for use in the charge transport layer coating liquid in Example 14 was replaced by the following positive hole transport material of formula (C):

(C)

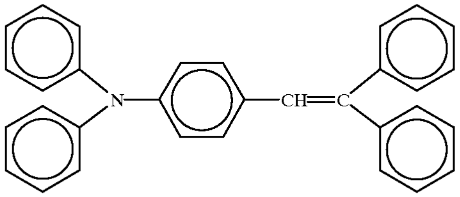

Thus, an electrophotographic photoconductor No. 27 according to the present invention was fabricated.

EXAMPLE 28

The procedure for fabrication of the electrophotographic photoconductor No. 14 in Example 14 was repeated except that the positive hole transport material of formula (D) for use in the charge transport layer coating liquid in Example 14 was replaced by the following charge transport material of formula (A):

(A)

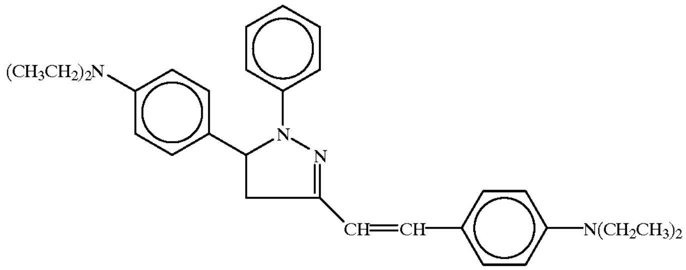

Thus, an electrophotographic photoconductor No. 28 according to the present invention was fabricated.

EXAMPLE 29

The procedure for fabrication of the electrophotographic photoconductor No. 14 in Example 14 was repeated except that the positive hole transport material of formula (D) for use in the charge transport layer coating liquid in Example 14 was replaced by the following charge transport material of formula (B);

(B)

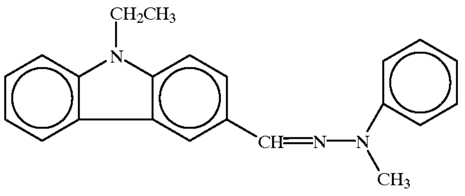

Thus, an electrophotographic photoconductor No. 29 according to the present invention was fabricated.

Each of the electrophotographic photoconductors No. 14 to No. 29 according to the present invention was charged negatively in the dark under application of −6 kV of corona charge for 20 seconds using a commercially available electrostatic copying sheet testing apparatus "Paper Analyzer Model EPA-8200" (Trademark), made by Kawaguchi Electro Works Co., Ltd.

Then, each photoconductor was allowed to stand in the dark for 20 seconds without applying any charge thereto, and the surface potential Vo (−V) of the photoconductor was measured.

Each photoconductor was then illuminated by a light of 20 lux, and the exposure $E_{1/2}$ (lux·sec) required to reduce the initial surface potential Vo (−V) to ½ the initial surface potential Vo (−V) was measured.

The results are shown in TABLE 6.

TABLE 6

| Example No. | Photoconductor No. | Vo (−V) | $E_{1/2}$ (lux · sec) |
|---|---|---|---|
| 14 | 14 | 889 | 28.6 |
| 15 | 15 | 991 | 13.1 |
| 16 | 16 | 962 | 29.7 |

TABLE 6-continued

| Example No. | Photoconductor No. | Vo (−V) | $E_{1/2}$ (lux · sec) |
|---|---|---|---|
| 17 | 17 | 897 | 27.3 |
| 18 | 18 | 962 | 25.4 |
| 19 | 19 | 894 | 16.1 |
| 20 | 20 | 974 | 23.1 |
| 21 | 21 | 909 | 24.6 |
| 22 | 22 | 983 | 13.1 |
| 23 | 23 | 1052 | 32.2 |
| 24 | 24 | 1073 | 22.7 |
| 25 | 25 | 1060 | 19.3 |
| 26 | 26 | 1054 | 29.2 |
| 27 | 27 | 924 | 34.9 |
| 28 | 28 | 703 | 44.8 |
| 29 | 29 | 852 | 34.5 |

EXAMPLE 30

[Fabrication of Laminated Type Photoconductor]

(Formation of Charge Generation Layer)

A mixture of one part by weight of the Cu-tetraazaporphyrin pigment obtained in Preparation Example 3, serving as a charge generation material, 50 parts by weight of a butyl acetate solution containing 2 wt. % of a commercially available polyvinyl butyral resin (Trademark "EM-S", made by Sekisui Chemical Co., Ltd.) and 49 parts by weight of n-butyl acetate was dispersed in a sand mill using 2-mm diameter glass beads for 2 hours.

Thus, a coating liquid for a charge generation layer was prepared.

The thus prepared charge generation layer coating liquid was coated on the aluminum surface of an aluminum-deposited PET film with a thickness of 75 μm serving as an electroconductive support, and dried at 80° C. for 5 minutes. Thus, a charge generation layer with a thickness of 0.2 μm was provided on the electroconductive support, (Formation of Charge Transport Layer)

A mixture of 8 parts by weight of an electron transport material represented by formula (III) as shown below, 11 parts by weight of a commercially available Z type polycarbonate resin (made by Teijin Chemicals Ltd.), and 0.02 parts by weight of a commercially available silicone oil (Trademark "KF50", made by Shin-Etsu Chemical Co., Ltd.) was dissolved in 91 parts by weight of tetrahydrofuran, so that a coating liquid for a charge transport layer was prepared.

(III)

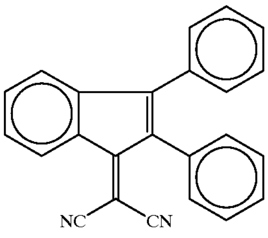

The thus prepared charge transport layer coating liquid was coated on the above prepared charge generation layer using a doctor blade and dried, so that a charge transport layer with a thickness of 20 μm was provided on the charge generation layer.

Thus, an electrophotographic photoconductor No. 30 according to the present invention was fabricated.

EXAMPLE 31

The procedure for fabrication of the electrophotographic photoconductor No. 30 in Example 30 was repeated except that the electron transport material of formula (III) for use in the charge transport layer coating liquid in Example 30 was replaced by the following electron transport material of formula (19):

(19)

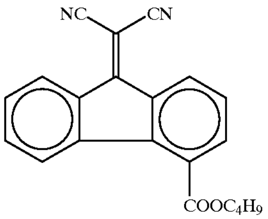

Thus, an electrophotographic photoconductor No. 31 according to the present invention was fabricated.

Each of the electrophotographic photoconductors No. 30 and No. 31 according to the present invention was charged positively in the dark under application of +5.3 kV of corona charge for 20 seconds using a commercially available electrostatic copying sheet testing apparatus "Paper Analyzer Model EPA-8200" (Trademark), made by Kawaguchi Electro Works Co., Ltd.

Then, each photoconductor was allowed to stand in the dark for 20 seconds without applying any charge thereto, and the surface potential Vo (V) of the photoconductor was measured.

Each photoconductor was then illuminated by a light of 20 lux, and the exposure $E_{1/2}$ (lux·sec) required to reduce the initial surface potential Vo (V) to ½ the initial surface potential Vo (V) was measured.

The results are shown in TABLE 7.

TABLE 7

| Example No. | Photoconductor No. | Vo (V) | $E_{1/2}$ (lux · sec) |
|---|---|---|---|
| 30 | 30 | 844 | 47.6 |
| 31 | 31 | 806 | 48.8 |

EXAMPLE 32

[Fabrication of Single-Layered Type Photoconductor]

(Formation of Single-layered Photoconductive Layer)

A mixture of 0.5 g of the Cu-tetraazaporphyrin pigment obtained in Preparation Example 3, serving as a charge generation material, 10 g of a solution prepared by dissolving a commercially available Z type polycarbonate resin (made by Teijin Chemicals Ltd.) in tetrahydrofuran so as to have a concentration of 10 wt. %, and 9 g of tetrahydrofuran was dispersed in a ball mill.

Thereafter, a tetrahydrofuran solution containing 10 wt. % of the Z type polycarbonate resin and a charge transport material of formula (D) were further added to the above-mentioned dispersion so that the amount ratio of pigment might be 2 wt. %, that of Z type polycarbonate resin be 50 wt. %, and that of charge transport material be 28 wt. %.

(D)

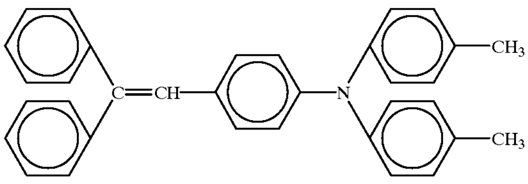

The thus obtained mixture was thoroughly stirred, so that a coating liquid for a photoconductive layer was prepared.

The thus prepared photoconductive layer coating liquid was coated on the aluminum surface of an aluminum-deposited polyester film serving as an electroconductive support using a doctor blade, and dried. Thus, a photoconductive layer with a thickness of 15 μm was provided on the electroconductive support.

Thus, an electrophotographic photoconductor No. 32 of a single-layered type according to the present invention was fabricated.

The electrophotographic photoconductor No. 32 according to the present invention was charged negatively in the dark under application of −6 kV of corona charge for 20 seconds using a commercially available electrostatic copying sheet testing apparatus "Paper Analyzer Model EPA-8200" (Trademark), made by Kawaguchi Electro Works Co., Ltd.

Then, the photoconductor was allowed to stand in the dark for 20 seconds without applying any charge thereto, and the surface potential Vo (−V) of the photoconductor was measured.

Each photoconductor was then illuminated by a light of 20 lux, and the exposure $E_{1/2}$ (lux·sec) required to reduce the initial surface potential Vo (−V) to ½ the initial surface potential Vo (−V) was measured.

The results are shown in TABLE 8.

TABLE 8

| Example No. | Photoconductor No. | Vo (−V) | $E_{1/2}$ (lux · sec) |
|---|---|---|---|
| 32 | 32 | 810 | 38.3 |

As previously mentioned, when the tetraazaporphyrin pigment is used as the charge generation material in the electrophotographic photoconductor, the sensitivity of the obtained photoconductor is improved.

Japanese Patent Application No. 09-203846 filed Jul. 14, 1997, Japanese Patent Application No. 09-357380 filed Dec. 25, 1997, and Japanese Patent Application filed Jul. 10, 1993 are hereby incorporated by reference.

What is claimed is:

1. An electrophotographic photoconductor comprising an electroconductive support, and a photoconductive layer formed thereon comprising a charge transport material and a charge generation material which comprises a pigment comprising a compound with a tetraazaporphyrin skeleton represented by formula (I):

(I)

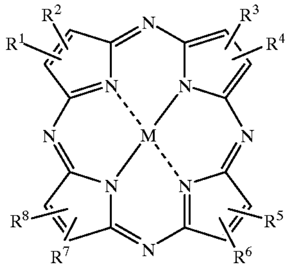

wherein M is hydrogen or an atom or compound capable of bonding to tetraazaporphyrin through a covalent bond or a coordinate bond; and $R^1$ to $R^8$ are each independently a hydrogen atom, a lower alkyl group or an aryl group which may have a substituent.

2. The electrophotographic photoconductor as claimed in claim 1, wherein said photoconductive layer is a single-layered photoconductive layer.

3. The electrophotographic photoconductor as claimed in claim 2, wherein said compound with a tetraazaporphyrin skeleton for use in said single-layered photoconductive layer is in such a crystalline form that exhibits a major diffraction peak at 21.2° in terms of a Bragg angle 2θ±0.2° in an X-ray diffraction spectrum using a Cu—Kα ray with a wavelength of 1.54 Å.

4. The electrophotographic photoconductor as claimed in claim 1, wherein said photoconductive layer comprises a charge generation layer comprising said pigment and a charge transport layer comprising said charge transport material, said charge generation layer and said charge transport layer being successively overlaid on said electroconductive support.

5. The electrophotographic photoconductor as claimed in claim 4, wherein said charge transport material comprises a positive hole transport material.

6. The electrophotographic photoconductor as claimed in claim 5, wherein said compound with a tetraazaporphyrin skeleton for use in said charge generation layer is in such a crystalline form that exhibits a major diffraction peak at 21.2° in terms of a Bragg angle 2θ±0.2° in an X-ray diffraction spectrum using a Cu—Kα ray with a wavelength of 1.54 Å.

7. The electrophotographic photoconductor as claimed in claim 6, wherein said positive hole transport material comprises a stilbene compound represented by formula (II):

(II)

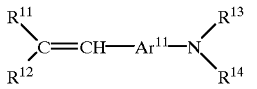

wherein $R_{11}$ and $R_{12}$ are each a hydrogen atom, an alkyl group which may have a substituent, or an aryl group which may have a substituent, and $R_{11}$ and $R_{12}$ may form a ring in combination; $R_{13}$ and $R_{14}$ are each a hydrogen atom, an alkyl group which may have a substituent, an aryl group which may have a substituent, or a heterocyclic group which may have a substituent; and $Ar^{11}$ is an arylene group which may have a substituent, or a heterocyclic group.

8. The electrophotographic photoconductor as claimed in claim 4, wherein said charge transport material comprises an electron transport material.

9. The electrophotographic photoconductor as claimed in claim 8, wherein said compound with a tetraazaporphyrin skeleton for use in said charge generation layer is in such a crystalline form that exhibits a major diffraction peak at 21.2° in terms of a Bragg angle 2θ±0.2° in an X-ray diffraction spectrum using a Cu—Kα ray with a wavelength of 1.54 Å.

10. The electrophotographic photoconductor as claimed in claim 4, wherein said compound with a tetraazaporphyrin skeleton for use in said charge generation layer is in such a crystalline form that exhibits a major diffraction peak at 21.2° in terms of a Bragg angle 2θ±0.2° in an X-ray diffraction spectrum using a Cu—Kα ray with a wavelength of 1.54 Å.

11. The electrophotographic photoconductor as claimed in claim 1, wherein said compound is in such a crystalline form that exhibits a major diffraction peak at 21.2° in terms of a Bragg angle 2θ±0.2° in an X-ray diffraction spectrum using a Cu—Kα ray with a wavelength of 1.54 Å.

12. The electrophotographic photoconductor as claimed in claim 1, wherein said pigment is obtained by subjecting a tetraazaporphyrin compound of formula (I) to an acid treatment so as to be in such a crystalline form that exhibits a major diffraction peak at 21.2° in terms of a Bragg angle 2θ±0.2° in an X-ray diffraction spectrum using a Cu—Kα ray with a wavelength of 1.54 Å.

13. The electrophotographic photoconductor as claimed in claim 1, wherein said pigment is obtained by subjecting a tetraazaporphyrin compound of formula (I) to an acid treatment, followed by a solvent treatment using a solvent, so as to be in such a crystalline form that exhibits a major diffraction peak at 21.2° in terms of a Bragg angle 2θ0.2° in an X-ray diffraction spectrum using a Cu—Kα ray with a wavelength of 1.54 Å, said solvent used in said solvent treatment being selected from the group consisting of an alcohol solvent, an ether solvent, a ketone solvent and water.

14. The electrophotographic photoconductor as claimed in claim 1, wherein said pigment is obtained by subjecting a tetraazaporphyrin compound of formula (I) to an acid treatment, followed by a solvent treatment using a solvent, so as to be in such a crystalline form that exhibits a major diffraction peak at 21.2° in terms of a Bragg angle 2θ±0.2° in an X-ray diffraction spectrum using a Cu—Kα ray with a wavelength of 1.54 Å, said solvent used in said solvent treatment being selected from the group consisting of an amine solvent and an aromatic hydrocarbon solvent.

15. The electrophotographic photoconductor as claimed in claim 1, wherein said pigment is obtained by subjecting a tetraazaporphyrin compound of formula (I) to such a treatment that said tetraazaporphyrin compound is added to a mixed solvent of a trihaloacetic acid and an alkylene halide to prepare a solution or a slurry, said solution or said slurry is added to a mixed solvent of a cyclic ether and water to precipitate crystals, and said crystals are successively washed with water and an aliphatic alcohol, so as to be in such a crystalline form that exhibits a major diffraction peak at 21.2° in terms of a Bragg angle 2θ±0.2° in an X-ray diffraction spectrum using a Cu—Kα ray with a wavelength of 1.54 Å.

16. The electrophotographic photoconductor as claimed in claim 9, wherein said electron transport material comprises (2,3-diphenyl-1-indenylidene)-malononitrile represented by formula (III):

(III)

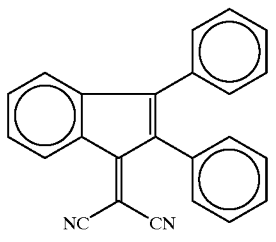

* * * * *

UNITED STATES PATENT AND TRADEMARK OFFICE

CERTIFICATE OF CORRECTION

PATENT NO. : 6,074,792
DATED : June 13, 2000
INVENTOR(S) : Michihiko Namba et al.

It is certified that error appears in the above-identified patent and that said Letters Patent is hereby corrected as shown below:

Column 25,
Line 24, "9-ethylcarbazole-3-aldehyde-1,-diphenylhydrazone" should read -- 9-ethylcarbazole-3-aldehyde-1,1-diphenylhydrazone --.

Column 29,
Line 34, "or s substituted" should read -- or a substituted --.

Column 40,
Line 60, "200 mi" should read -- 200 ml --.

Column 47,
Line 26, "EM-S" should read -- BM-S --.

Column 50,
Lines 17-18, "a hydrogen atom" should read -- hydrogen --

Column 51,
Line 32, "$2\theta 0.2°$" should read -- $2\theta \pm 0.2°$ --.

Signed and Sealed this

Second Day of April, 2002

*Attest:*

JAMES E. ROGAN

*Attesting Officer*

*Director of the United States Patent and Trademark Office*